(12) United States Patent
Archer

(10) Patent No.: US 11,578,630 B2
(45) Date of Patent: *Feb. 14, 2023

(54) FLUID TREATMENT APPARATUS FOR AN EXHAUST SYSTEM AND METHOD THEREOF

(71) Applicant: ARCS ENERGY LIMITED, Harrow (GB)

(72) Inventor: Anthony Archer, Norton (GB)

(73) Assignee: ARCS ENERGY LIMITED, Harrow (GB)

( * ) Notice: Subject to any disclaimer, the term of this patent is extended or adjusted under 35 U.S.C. 154(b) by 219 days.

This patent is subject to a terminal disclaimer.

(21) Appl. No.: 16/761,966

(22) PCT Filed: Dec. 14, 2018

(86) PCT No.: PCT/GB2018/053627
§ 371 (c)(1),
(2) Date: May 6, 2020

(87) PCT Pub. No.: WO2019/130017
PCT Pub. Date: Jul. 4, 2019

(65) Prior Publication Data
US 2021/0131325 A1 May 6, 2021

(30) Foreign Application Priority Data
Dec. 28, 2017 (GB) .................................... 1722035

(51) Int. Cl.
*F01N 3/08* (2006.01)
*B01D 53/32* (2006.01)

(52) U.S. Cl.
CPC ........... *F01N 3/0892* (2013.01); *B01D 53/32* (2013.01); *B01D 2259/806* (2013.01)

(58) Field of Classification Search
CPC .............. B01D 53/32; B01D 2259/806; B01D 2259/80; B01D 53/885; F01N 3/0892;
(Continued)

(56) References Cited

U.S. PATENT DOCUMENTS 3,439,476 A * 4/1969 Knight ...................... B03C 3/70
55/460
3,934,566 A 1/1976 Ward
(Continued)

FOREIGN PATENT DOCUMENTS

CN 201265443 Y 7/2009
CN 103998121 A 8/2014
(Continued)

OTHER PUBLICATIONS

Search Report for GB application 1722035.1 dated Jun. 6, 2018.
(Continued)

*Primary Examiner* — Xiuyu Tai
(74) *Attorney, Agent, or Firm* — Workman Nydegger

(57) ABSTRACT

An exhaust system is described comprising an array of a plurality of operably coupled fluid treatment apparatus for the treatment of a fluid substance. Each one of the plurality of fluid treatment apparatus comprises a reactor chamber defined by a perimeter wall; a fluid inlet adapted to provide fluid communication from an external supply of a fluid substance to be treated to said reactor chamber whereby said fluid substance passes into and through said reactor chamber; a fluid outlet adapted to provide a fluid communication from said reactor chamber whereby said fluid substance passes from said reactor chamber; at least one electromagnetic radiation (EMR) waveguide, having a waveguide input port and a waveguide output port, operably coupled within said reactor chamber and adapted to couple electromagnetic radiation of at least one predetermined wavelength to a fluid
(Continued)

substance passing through said reactor chamber, wherein said perimeter wall of said reactor chamber is adapted to force said fluid substance received from said fluid inlet and passing through said reactor chamber into a continuous swirling flow towards said fluid outlet. The exhaust system in an embodiment further comprises a housing, having at least one exhaust inlet port and at least one exhaust outlet port, adapted to operably receive and enclose said array of a plurality of operably coupled fluid treatment apparatus, and at least one fluid tight seal member, adapted to engage with at least an outer surface of said array of a plurality of operably coupled fluid treatment apparatus, so as to provide a fluid tight seal between an inner surface of said housing and said at least one outer surface of said array of a plurality of operably coupled fluid treatment apparatus.

27 Claims, 30 Drawing Sheets

(58) Field of Classification Search
CPC .. F01N 2240/05; F01N 3/2026; F01N 3/2828; F01N 11/002; F01N 3/2013; F01N 9/00; F01N 2900/08; F01N 2900/104; F01N 2510/00; B01J 19/087; B01J 19/02; B01J 19/12; B01J 2219/0268; B01J 2219/00159; B01J 2219/00155; B01J 2219/0875; B01J 2219/0892; B01J 2219/0204; B01J 2219/0236; B01J 2219/00146; B01J 2219/0218; B01J 2219/0854; B01J 2219/182; B01J 2219/0209; B01J 2219/0286; B01J 2219/00141; B01J 2219/192; B01J 37/0215; C01B 2203/0233; C01B 2203/0238; C01B 13/11; C01B 13/10; H05B 6/6494; H05B 6/72; H05B 6/108; Y02C 20/20; Y02A 50/20; Y02T 10/12; Y02T 10/40
See application file for complete search history.

(56) References Cited

U.S. PATENT DOCUMENTS

| | | |
|---|---|---|
| 4,825,651 A | 5/1989 | Puschner et al. |
| 2001/0003338 A1 | 6/2001 | Schulz et al. |
| 2003/0226840 A1* | 12/2003 | Dalton ................. B01D 53/32 |
| | | 219/759 |
| 2006/0070372 A1 | 4/2006 | Lucas et al. |
| 2007/0164220 A1 | 7/2007 | Luk |
| 2008/0234530 A1 | 9/2008 | Kabouzi |
| 2009/0266051 A1 | 10/2009 | Musa et al. |
| 2010/0200390 A1 | 8/2010 | Ikeda et al. |
| 2012/0305496 A1* | 12/2012 | Zadyraka .............. H05B 6/802 |
| | | 250/435 |
| 2013/0240507 A1* | 9/2013 | Kimrey, Jr. .............. A61L 2/04 |
| | | 219/702 |
| 2013/0336849 A1 | 12/2013 | Ikeda |
| 2014/0123681 A1* | 5/2014 | Urbahn .................. G01R 33/31 |
| | | 62/3.1 |
| 2014/0283503 A1 | 9/2014 | Roesch et al. |
| 2016/0346729 A1* | 12/2016 | Yi ........................ B01D 53/007 |

FOREIGN PATENT DOCUMENTS

| | | | |
|---|---|---|---|
| CN | 109562348 A | 4/2019 | |
| DE | 19956290 A1 | 5/2001 | |
| EP | 0412019 | 8/1990 | |
| EP | 2181761 | 5/2010 | |
| EP | 2781258 | 9/2014 | |
| EP | 3478405 A1 | 5/2019 | |
| GB | 2533820 A | 7/2016 | |
| GB | 2553752 | 7/2016 | |
| JP | H11 90216 | 4/1999 | |
| JP | H1190216 A | 4/1999 | |
| JP | 2009034674 A | 2/2009 | |
| JP | 2009517197 A | 4/2009 | |
| JP | 2012132568 A | 7/2012 | |
| JP | 2013508136 A | 3/2013 | |
| JP | 2013244445 | 12/2013 | |
| JP | 2016182599 A | 10/2016 | |
| WO | 2013/070095 | 5/2013 | |
| WO | WO2013070095 A | 5/2013 | |
| WO | WO2016110674 A * | 7/2016 | ............ B01J 19/087 |
| WO | 2018/002639 A1 | 1/2018 | |

OTHER PUBLICATIONS

International Search Report and Written Opinion for PCT/GB2018/053627 dated Feb. 1, 2019.

Written Opinion of the International Preliminary Examining Authority for PCT/GB2018/053627 dated Oct. 14, 2019.

\* cited by examiner (a)
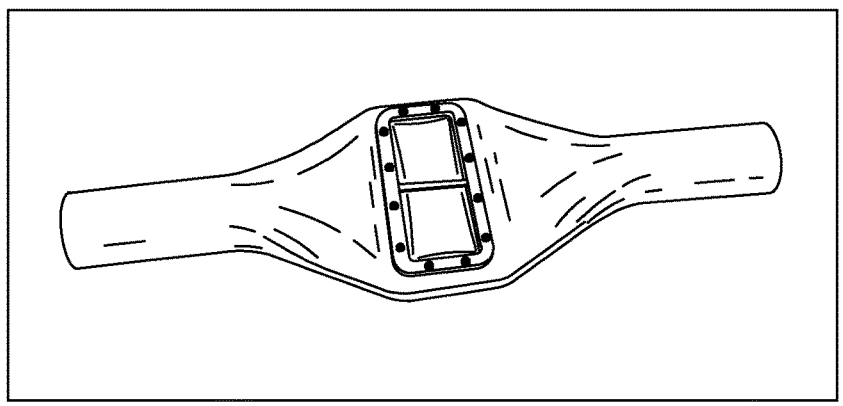
(b)
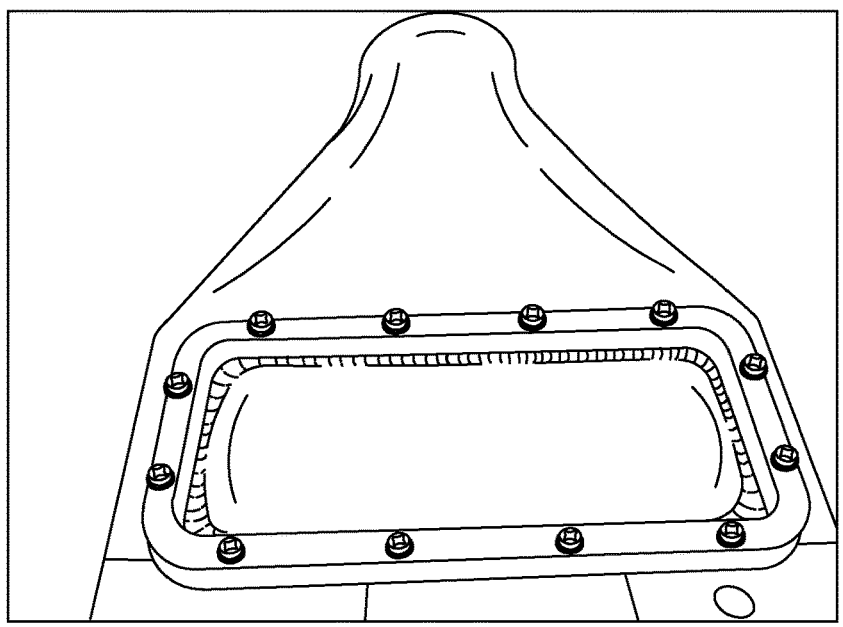
(c)
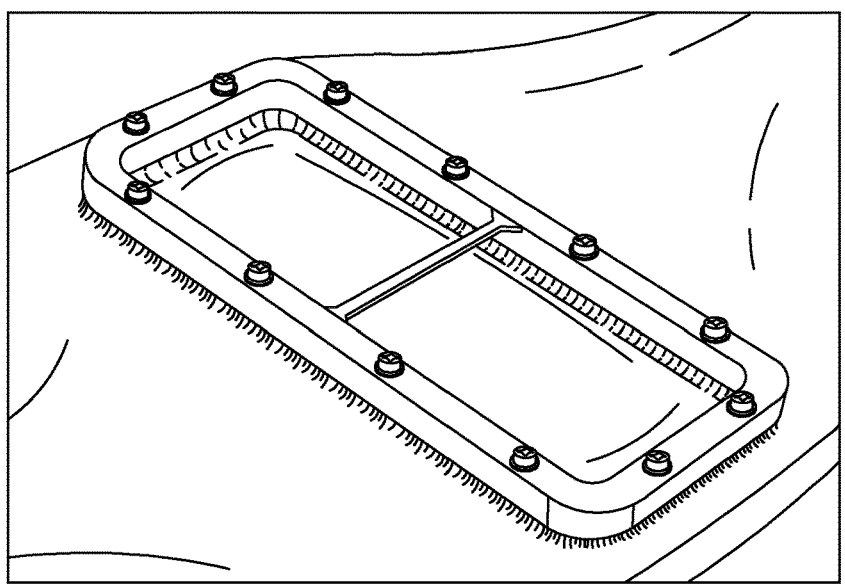
FIG. 13

SECTION A-A

FLUID TREATMENT APPARATUS FOR AN EXHAUST SYSTEM AND METHOD THEREOF

CROSS-REFERENCE TO RELATED APPLICATIONS

The present application is a 35 U.S.C. § 371 U.S. National Stage of International Application No. PCT/GB2018/053627, filed on Dec. 14, 2018, which claims priority to Great Britain Patent Application No. 1722035.1, filed Dec. 28, 2017, the entire content of each of which is incorporated herein by reference.

The present invention relates generally to the field of the treatment of fluid streams and to an apparatus and method for the control of levels of particular component substances thereof. The present invention relates further to the reduction of levels of harmful component substances in the fluid products of physical and chemical processes, and in particular the combustion products of combustion processes. In addition, the present invention relates to an apparatus, such as an exhaust, for improved reduction of levels of undesirable emissions from the exhaust gases of combustion processes.

INTRODUCTION

There is a wide range of physical and chemical industrial processes that produce a fluid output whether as a primary or by-product which includes component substances that are undesirable, whether as potentially detrimental to the primary product or as potentially detrimental to human health or the environment. In particular there is a growing awareness of the undesirability of release of by-product fluids into the environment that still contain high levels of undesirable substances potentially injurious to health or to the biosphere.

In particular it is generally desirable to reduce the levels of such harmful component substances in a by-product gas stream, such as a combustion flue gas stream, that is to be vented to atmosphere. Such harmful component substances are often referred to as "emissions". It will be understood that in this and other contexts herein references to a gas stream include references to a stream that is primarily gaseous but may include vapour droplets, particulates etc. entrained and carried therein. References herein to "emissions" in a gas stream may include gaseous phase components of the gas stream as well as such fluidly entrained vapour droplets, particulates etc.

The invention is particular concerned with the reduction of "emissions" and with the "cleaning up" of exhaust flue gases from combustion apparatus such as thermal generators, internal combustion engines and the like. The industrialized world has primarily evolved around the combustion engine, which is capable of providing mechanical energy to do work in a vast variety of circumstances. However, while the employment of combustion engines has significantly increased the industrial output, it is certainly not without detriment. For example, combustion engines run, for the most part, on fossil fuels such as gasoline and diesel fuel (i.e. hydrocarbons), which are primarily derived by the refinement of crude oil and which provide an easily transportable reservoir of energy for mobile engines (automobile, ships, planes etc.). However, the burning of fuel in such engines is never completely efficient and as a consequence, engines employing conventional gas and diesel fuel suffer from excess fuel consumption and low engine efficiency. Furthermore, potentially harmful emissions in exhaust combustion flue gases may contribute pollutants and greenhouse gasses such as NOx (oxides of Nitrogen), unburnt HC (hydrocarbons), CO (Carbon Monoxide), $NO_2$ (nitrogen dioxide), NO (nitric oxide) to the atmosphere.

Therefore, any apparatus or method that can reduce these emissions would be very desirable.

Accordingly, it is an object of the present invention to provide an apparatus and method for "cleaning up" exhaust flue gases and reducing "emissions".

SUMMARY OF THE INVENTION

Preferred embodiment(s) of the invention seek to overcome one or more of the above disadvantages of the prior art.

According to a first embodiment of the invention there is provided an exhaust system comprising:
an array of a plurality of operably coupled fluid treatment apparatus for the treatment of a fluid substance, each one of the fluid treatment apparatus comprising:
  a reactor chamber;
  a fluid inlet adapted to provide fluid communication from an external supply of a fluid substance to be treated to said reactor chamber whereby said fluid substance may pass into and through said reactor chamber;
  a fluid outlet adapted to provide a fluid communication from said reactor chamber whereby said fluid substance may pass from said reactor chamber;
  at least one first electromagnetic radiation (EMR) waveguide, having at least one first waveguide input port and at least one first waveguide output port, operably coupled within said reactor chamber and adapted to couple electromagnetic radiation of at least predetermined wavelength to a fluid substance passing through said reactor chamber;
  wherein said perimeter wall of said reactor chamber is adapted to force said fluid substance received from said fluid inlet and passing through said reactor chamber into a continuous swirling flow towards said fluid outlet.

Conveniently the array of a plurality of operably coupled fluid treatment apparatus for the treatment of a fluid substance is provided in a common housing. In this case the exhaust system of the invention further comprises:
  a housing, having at least one exhaust inlet port and at least one exhaust outlet port, adapted to operably receive and enclose said array of a plurality of operably coupled fluid treatment apparatus, and
  at least one fluid tight seal member, adapted to engage with at least an outer surface of said array of a plurality of operably coupled fluid treatment apparatus, so as to provide a fluid tight seal between an inner surface of said housing and said at least one outer surface of said array of a plurality of operably coupled fluid treatment apparatus.

The exhaust system is based on the principles of and embodies a fluid treatment apparatus for the treatment of a fluid substance having multiple component substances to control levels of one or more particular component substances, comprising:
  a reactor chamber;
  a fluid inlet adapted to provide fluid communication from an external supply of a fluid substance to be treated to said reactor chamber whereby said fluid substance may pass into and through said reactor chamber;

a fluid outlet adapted to provide a fluid communication from said reactor chamber whereby said fluid substance may pass from said reactor chamber;

at least one first electromagnetic radiation (EMR) waveguide, having a first waveguide input port and a first waveguide output port, operably coupled within said reactor chamber and adapted to couple electromagnetic radiation of a predetermined first wavelength to a fluid substance passing through said reactor chamber.

The apparatus provides the advantage that the "coupling" of the electromagnetic radiation of the predetermined wavelength of the electromagnetic radiation across the reactor volume may provide a source of energy for the treatment of a fluid stream passing through it. Subject to appropriate selection of electromagnetic radiation wavelength and dimensions and configurations of reactor chamber, and in particular in that regard position of the first waveguide input port and first waveguide output port, energy may be imparted to components of the fluid substance passing through a reaction zone defined thereby in the reactor chamber in such a manner as to control, modify and where desired reduce levels of harmful component substances. Although this aspect of the invention relates to an apparatus and is not limited by any physical theory it is considered that by appropriate selection of conditions the "coupling" electromagnetic radiation may be matched to that required to dissociate and remove component materials from the fluid stream.

Particular advantages are envisaged in application of the apparatus in an exhaust gas stream for improved reduction of levels of undesirable emissions from the exhaust gases of combustion processes to minimise any potential emission exhaust form combustion. The apparatus of the present invention may be utilised in existing combustion engines for example within an existing exhaust system as a component or modification thereof to reduce its exhaust emissions.

In a typical embodiment, the reactor chamber may be defined by a perimeter wall and said first waveguide input port and first waveguide output port are operably coupled to spaced apart locations on said perimeter wall such as to be operably coupled to each other across a reactor volume defined within said reactor chamber. Preferably, said reactor chamber may be configured to force said fluid substance passing through said reactor chamber into a continuous swirling flow from said fluid inlet towards said fluid outlet. Even more preferably, said perimeter wall of said reactor chamber may be adapted to force said fluid substance received from said fluid inlet and passing through said reactor chamber into a continuous swirling flow towards said fluid outlet. This provides the advantage that the fluid substance is kept within the reactor chamber for a prolonged period of time, allowing more energy to be coupled from the EMR to the fluid substance.

In this embodiment, the first electromagnetic radiation (EMR) waveguide comprises first and second parts spaced apart across a reactor volume defined within said reactor chamber, a first part including said first waveguide input port and a second part including said first waveguide output port. For example said first electromagnetic radiation (EMR) waveguide comprises first and second EMR couplers respectively provided in spaced apart locations on said perimeter wall such as to be operably coupled across a reactor volume defined within said reactor chamber.

Advantageously said first waveguide input port and a first waveguide output port are provided coupled to diametrically opposed locations on said perimeter wall such as to be operably coupled across a full width of the reactor volume defined within said reactor chamber. Thus for example said first and second EMR couplers are located on diametrically opposed locations on said perimeter wall.

Advantageously the at least one first electromagnetic radiation (EMR) waveguide comprises an optical interface adapted to couple electromagnetic radiation of said predetermined first wavelength into said reactor chamber.

Advantageously the optical interface comprises a first interface member operably coupled to said waveguide input port and a second interface member operably coupled to said waveguide output port.

Advantageously the reactor chamber is defined by a perimeter wall and the first interface member and the second interface member comprise portions of the wall adapted to be at least partly transparent to electromagnetic radiation of a predetermined first wavelength.

Each of the first interface member and the second interface member for example comprise apertured portions of the wall having a closure plug fabricated from a material at least partly transparent to electromagnetic radiation of a predetermined first wavelength. For example each interface member comprises an apertured portion of the wall provided with a glass closure plug.

Advantageously the first electromagnetic radiation (EMR) waveguide comprises a first EMR coupler operably coupled to said first waveguide input port and to said first interface member and a second EMR coupler operably coupled to said first waveguide output port and to said second interface member.

Subject to appropriate selection of parameters including electromagnetic radiation wavelength and configuration of reactor chamber, electromagnetic radiation may be coupled in use to components of the fluid substance passing through a reaction zone defined thereby in the reactor chamber in such a manner as to control, modify and where desired reduce levels of harmful component substances.

In a preferred case, the apparatus is configured and the predetermined first electromagnetic radiation wavelength is selected to generate a standing wave across the reactor chamber, for example across a reaction zone defined between respective coupling locations of the first waveguide input port and first waveguide output port.

For example the reactor chamber is configured, the first waveguide input port and first waveguide output port are positioned, and the predetermined first electromagnetic radiation wavelength is selected such that in use a standing wave is generated across a reaction zone so defined.

Preferably, the predetermined first wavelength is between 1 mm and 1 metres at a respective frequency spectrum of 300 GHz to 300 MHz (microwave). More preferably the predetermined first wavelength is between 3 mm and 0.6 metres at a respective frequency spectrum of 100 GHz to 500 MHz.

In use a fluid substance to be treated is supplied to the fluid inlet.

More completely, the apparatus comprises a fluid substance supply source fluidly coupled to the fluid inlet to enable supply of a fluid substance to be treated to said reactor chamber.

The apparatus may further comprise a fluid substance discharge conduit fluidly coupled to the fluid outlet to enable a fluid substance to pass from and be conveyed away from said reactor chamber.

In a preferred application of the invention to the treatment of a combustion exhaust stream, the fluid substance supply source may be a combustion flue gas conduit, and the fluid substance discharge conduit may be a combustion flue gas exhaust, the reactor chamber thus being disposed within the combustion flue gas flow as a component or modification thereof to modify or control levels of one or more component substances.

For example in a particularly preferred application of the invention to the treatment of exhaust gases from a combustion engine to reduce emissions, the reactor chamber may disposed within the exhaust system of a combustion engine as a component or modification thereof to reduce its exhaust emissions. The inclusion of a reactor chamber embodying the principles of the invention into an existing design of an exhaust system of a combustion engine may provide the advantage of reduced emissions and may allow for other components to be modified or dispensed with offering potentially reduced complexity and/or cost.

Advantageously, the fluid substance to be treated may be at an elevated temperature. Conveniently in many applications, the fluid substance may be the product of an industrial process such as a combustion process that is thereby already at an elevated temperature. Additionally or alternatively a heating apparatus may be provided.

In this case an apparatus incorporated into an exhaust system of the invention may further comprise:
a fluid substance supply source fluidly coupled to the fluid inlet to enable supply of a fluid substance to be treated to said reactor chamber;
a heater assembly, fluidly coupled between the fluid substance supply source and said reactor chamber, and adapted to transfer energy to the fluid substance, so as to supply the fluid substance at a predetermined temperature into the reactor chamber.

Advantageously, said predetermined temperature may be greater than 300 degrees centigrade. Even more preferably, said predetermined temperature may be greater than 500 degrees centigrade. Even more preferably, said predetermined temperature may be greater than 600 degrees centigrade.

Advantageously, the at least one first electromagnetic radiation (EMR) waveguide may be made of a material with a low bulk resistivity. Advantageously, the at least one first electromagnetic radiation (EMR) waveguide may be made of a metallic material. Preferably, the metallic material may be selected from aluminium, copper, silver and gold and alloys thereof with other metallic elements. A possible material is brass.

Advantageously the fluid treatment apparatus further comprises an electromagnetic radiation (EMR) generator to generate electromagnetic radiation (EMR) of a predetermined first wavelength, operably coupled to said waveguide input port.

Advantageously, the EMR generator may further comprise an input transmission line, operably coupleable to a first waveguide input port of the first electromagnetic radiation (EMR) waveguide, and an output transmission line, operably coupleable to a first waveguide output port of the first electromagnetic radiation (EMR) waveguide, wherein said microwave generator, said input transmission line and said output transmission line are adapted to form a closed-loop EMR circuit with said first electromagnetic radiation (EMR) waveguide. Any one of the first waveguide input and output port may be Advantageously, the EMR generator may be a microwave generator and the generated electromagnetic radiation has a wavelength between 1 mm and 1 metres at a respective frequency spectrum of 300 GHz to 300 MHz (microwave), and more preferably the generated electromagnetic radiation has a wavelength between 3 mm and 0.6 metres at a respective frequency spectrum of 100 GHz to 500 MHz.

Preferably, the microwave generator may be any one of a Klystron, a Gyrotron, a Magnetron and a solid-state electronic source.

Advantageously, said electromagnetic radiation (EMR) generator may be adapted to optimise the coupling between said electromagnetic radiation (EMR) and said fluid substance. Preferably, said coupling between said electromagnetic radiation (EMR) and said fluid substance may be optimised automatically utilising a predetermined control algorithm. Advantageously, said fluid inlet may be adapted to change an initial fluid pressure of said fluid substance to a predetermined first fluid pressure when passing through said fluid inlet. Preferably, said predetermined first fluid pressure may be greater than said initial fluid pressure.

Advantageously, said fluid outlet may be adapted to change a chamber fluid pressure of said fluid substance to a predetermined second fluid pressure when passing through said fluid outlet. Preferably, said predetermined second fluid pressure may be greater than said chamber fluid pressure. Even more preferably, said first predetermined fluid pressure may be greater than said second predetermined pressure, Therefore, the inlet being a reduced port creates a pressured flow and the exit also a reduced port helps maintain the pressure and spin effect near the microwave field which helps with the Joule-Thomson effect of gas expansion effect. The pressure and spin of the fluids within the reactor chamber being most critical. Furthermore, the field strength may be sustained and measured against flow, volume, pressure and temperature, with each parameter playing a role in achieving the desired ARCS effect.

Preferred embodiment(s) of the invention seek to overcome one or more of the above disadvantages of the prior art.

According to a further embodiment of the invention there is provided a method for the treatment of a fluid substance, comprising:
providing an exhaust system according to the above described embodiment of the invention comprising an array of a plurality of operably coupled fluid treatment apparatus, each one of said plurality of operably coupled fluid treatment apparatus providing a reactor chamber configured such that a supply of said fluid substance may pass into and through said reactor chamber;
providing at least one first electromagnetic radiation (EMR) waveguide, having a first waveguide input port and a first waveguide output port, operably coupled within said reactor chamber and adapted to couple electromagnetic radiation of a predetermined first wavelength to a fluid substance passing through said reactor chamber of any one of said plurality of operably coupled fluid treatment apparatus;
causing a fluid substance to pass into and through said reactor chamber of any one of said plurality of operably coupled fluid treatment apparatus;
causing electromagnetic radiation to pass via the at least one first electromagnetic radiation (EMR) waveguide and thereby couple across the reactor chamber of any one of said plurality of operably coupled fluid treatment apparatus.

The method thus couples the EMR radiation across a reaction zone defined in the reactor chamber as fluid substance to be treated is passed therethrough. As described in connection with the apparatus, this may provide a source of energy for the treatment of a fluid stream passing through it. Subject to appropriate selection of electromagnetic radiation wavelength and dimensions and configurations of reactor chamber, energy may be imparted to components of the fluid substance passing through a reaction zone defined thereby in the reactor chamber in such a manner as to control, modify and where desired reduce levels of harmful component substances.

The fluid substance for example has multiple component substances to control levels of one or more particular component substances. Particular advantages are envisaged in application of the method to an exhaust gas stream for improved reduction of levels of undesirable emissions from the exhaust gases of combustion processes to minimise any potential emission exhaust form combustion. The method may be utilised in existing combustion engines for example within an existing exhaust system to reduce exhaust emissions.

The method is in particular a method for the operation of an apparatus embodying the principles of the first embodiment of the invention and preferred method steps will be understood by analogy.

In particular the method may comprise operably coupling a first waveguide input port and a first waveguide output port within said reactor chamber by operably coupling said first waveguide input port and first waveguide output port to spaced apart locations on a perimeter wall of said reactor chamber such as to be operably coupled to each other across a reactor volume defined within said reactor chamber.

In particular the method comprises operably coupling a first waveguide input port and a first waveguide output port within said reactor chamber by means of an optical interface, for example wherein the first interface member and the second interface member comprise portions of the wall adapted to be at least partly transparent to electromagnetic radiation of a predetermined first wavelength.

Preferably, the method comprises generating a standing wave across the reactor chamber.

Preferably, the predetermined first wavelength is between 1 mm and 1 meter at a respective frequency spectrum of 300 GHz to 300 MHz (microwave).

BRIEF DESCRIPTION OF THE DRAWINGS

Preferred embodiments of the present invention will now be described, by way of example only and not in any limitative sense, with reference to the accompanying drawings, in which:

FIG. 13 shows different views (a) (b) and (c) of an example exhaust;

DETAILED DESCRIPTION OF THE PREFERRED EMBODIMENT(S)

Figure 1:
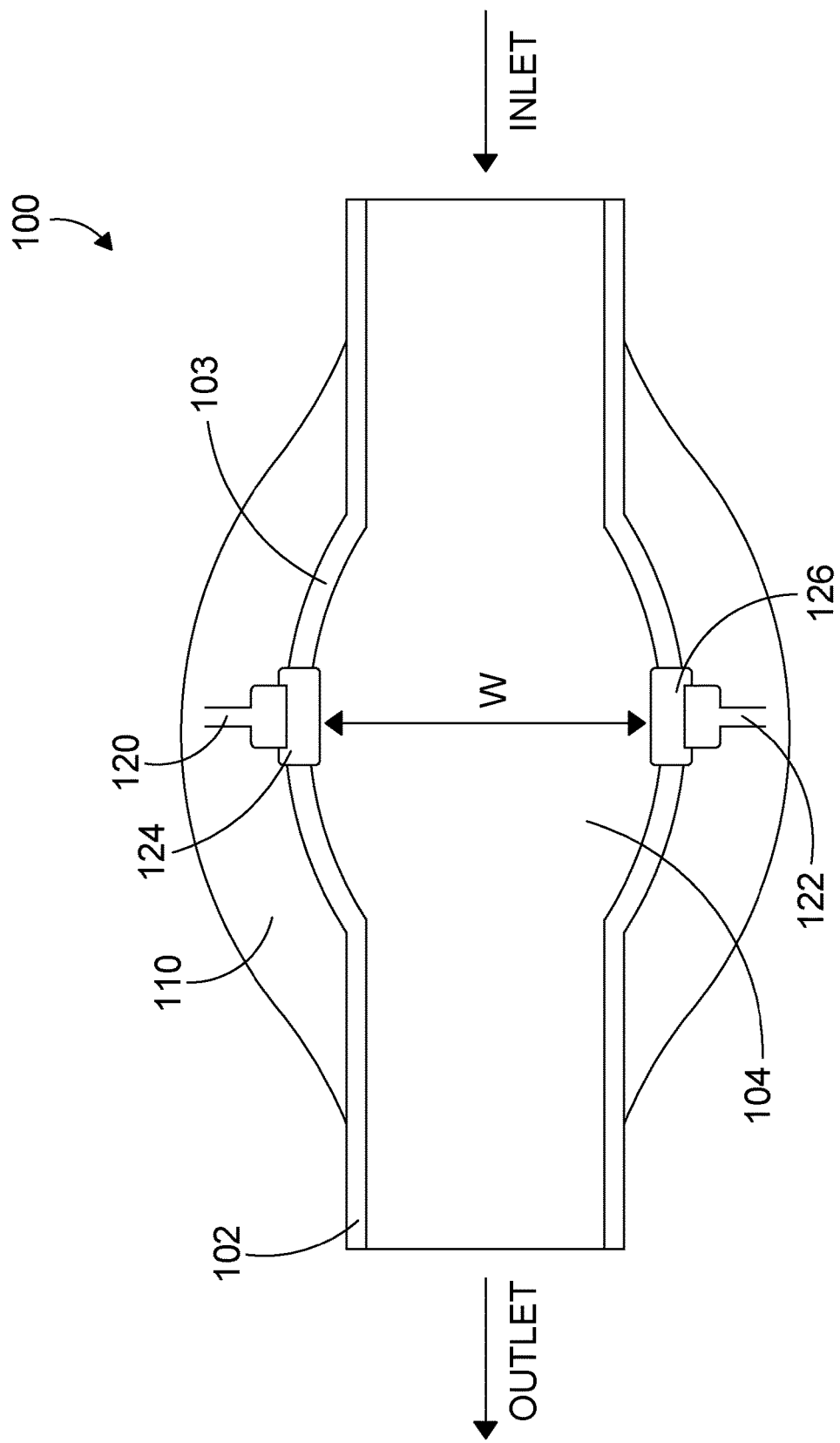
FIG. 1 shows in cross section an apparatus in accordance with an embodiment of the invention suitable for use in an exhaust system of an internal combustion engine.

A particular preferred application of the principles of the invention relates to the "cleaning" of exhaust combustion products, for example in the exhaust stream of a combustion engine. FIG. 1 shows, in cross section, an apparatus in accordance with an embodiment of the invention suitable for use in an exhaust system of an internal combustion engine.

In accordance with the example application of the invention, exhaust flue gases may be "cleaned" (i.e. reduction of harmful exhaust such as NOX, CO etc.) by providing the apparatus 100 within the exhaust output path. For example, the apparatus 100 may be provided at the exhaust of a combustion engine (e.g. diesel or petrol) of a vehicle to reduce or even remove harmful components from the exhaust gas.

The apparatus 100 includes a main body in the form of an elongate tube 102 with a convex central portion 103 defining an open reactor chamber 104. The two ends of the tube respectively define an inlet and an outlet which in the preferred application will be in fluid communication with and for example incorporated into an exhaust tube (not shown) of a combustion engine. A flow of exhaust gases to be treated may thereby be maintained in use continuously into and through the reactor chamber 104. It is generally desirable for the effective functioning of the invention that the exhaust gases are at an elevated temperature and accordingly the inlet end is preferably located closely downstream of the exhaust manifold. Additionally or alternatively a heater (not shown) may be provided upstream of the inlet.

An EMR waveguide system is provided to couple microwave electromagnetic radiation of a predetermined wavelength across the reactor chamber 104. This includes first and second EMR couplers 120, 122 respectively located at diametrically opposite sides of the widest part of the convex wall 103 that defines the reactor chamber 104. The first and second EMR couplers 120, 122 respectively define a waveguide input port and a waveguide output port which are coupled with a microwave generator (e.g. 0 to 100 W input, 2.45 Ghz) and a power source via an input transmission line and an output transmission line shown generally compactly associated together as the surrounding generator assembly 110. The first and second EMR couplers 120, 122 are coupled to respective first and second optical interfaces 124, 126 in the form of glass plugs let into and hermetically sealing apertures in the convex wall 103.

The arrangement thus forms a closed-loop EMR circuit with the microwave generator connected via the input transmission line and output transmission line to the respective EMR couplers 120, 122 which define an EMR waveguide and operably couple the EMR radiation across the cavity in the reactor chamber 104, thus coupling EMR radiation to exhaust gases passing through the reactor chamber. A standing wave W may be generated within the reactor chamber 104 between the first and second optical interface.

In use it is thus possible to couple the EMR radiation across a reaction zone defined in the reactor chamber 104 as exhaust to be treated is passed therethrough. Energy may be imparted to components of the exhaust gas stream passing through the reaction zone in such a manner as to reduce levels of emissions.

After "clean-up" by the apparatus 100, the exhaust gas may contain a higher percentage of oxygen, so that the "cleaned" may be recycled into the combustion engine to improve the energy efficiency of the engine. Alternatively, it may be exhausted to atmosphere in conventional manner.

Testing has been carried out of a prototype device, referred to below by the acronym ARCS, as a device for reduction of vehicle emissions.

The test, in summary, involves passing the exhaust gas from a fully warmed diesel vehicle across the ARCS device and logging data during an engine idle using a proprietary workshop 5 gas exhaust emissions analyser. Data logs with the ARCS device active and passive were acquired. The ARCS device has an adjustable input power range of between 1 and 100 W. For the current study input power was limited to 45 W.

The exhaust gas emissions were analysed using a Sykes Pickavant 5 gas exhaust emissions analyser. The 5 gases analysed are Carbon Monoxide (CO), Carbon Dioxide ($CO_2$), Oxygen ($O_2$), Hydrocarbons (HC) and Nitrogen Monoxide (NO).

Figure 2:
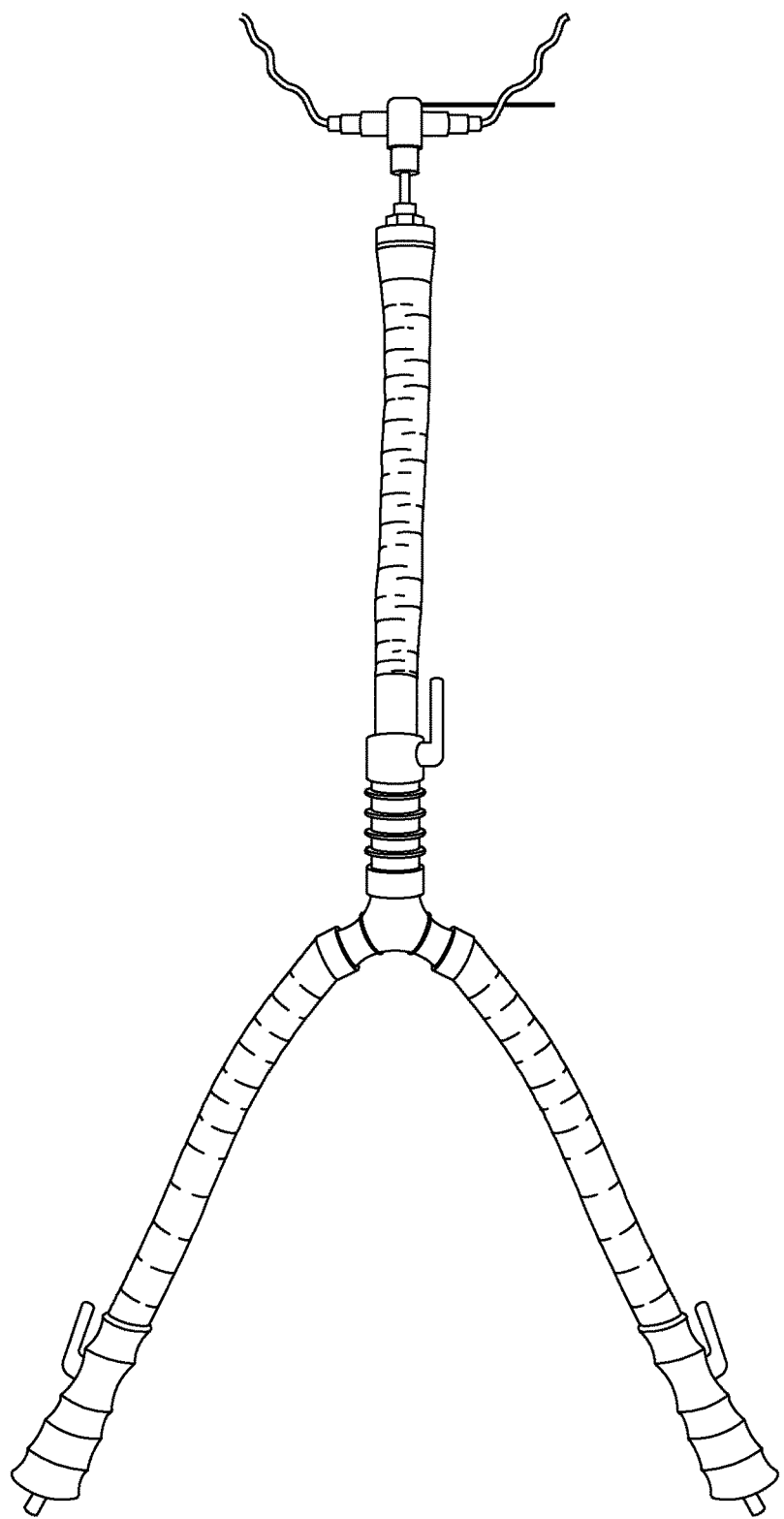
FIG. 2 shows a schematic of a test system to test the principles of the invention when applied to control vehicle exhaust emissions.

Exhaust gases from the dual vehicle exhausts were ducted through two flexible exhaust hoses of approximately 3.3 m length after which they were combined into a single hose using a plastic Y piece. A further hose of approximately 1.8 m connected the Y piece to the ARCS device. As the ARCS hardware had been primarily designed for use in a fuel reformer application a number of adaptors were required to mate the exhaust hoses to the ARCS device. After passing through the ARCS device the exhaust gases exited into a vertically mounted transparent plastic stack pipe of approximately 0.88 m length into which the exhaust analyser probe was inserted. The analyser probe was connected to the analyser with approximately 5 m of transparent hose. A schematic drawing of the hoses up to the ARCS device is included in FIG. 2.

At the start of the test sequence the vehicle was started and idled to allow the engine and exhaust after treatment system to warm up to normal running temperatures. Both the ARCS on and ARCS off tests were performed sequentially during one continuous vehicle idle.

Two tests were performed; one with the ARCS device active and one with the ARCS device passive. Prior to each of the tests the exhaust gas analyser zero check procedure was performed. This procedure involves removing the probe from the test installation and sampling fresh air outside of the workshop environment. After sampling fresh air for 60 s the CO, HC, $CO_2$ & NO readings are zeroed and the oxygen reading is set to 20.9%.

During the set-up of the ARCS on test the vehicle exhaust was disconnected and ducted outside of the workshop, the vehicle remained at idle. At the start of the test the analyser data log was started and the exhaust was reconnected. After a suitable delay to allow the analyser to register the exhaust gas emissions the ARCS device was switched on. Towards the end of the test the ARCS device was switched off and the changes in the exhaust gas emissions were logged. For the ARCS off test the analyser exhaust sample probe was placed in the exhaust ducting after the Y piece and the exhaust gas was ducted outside of the workshop. All emissions data was acquired at a 1 s sample rate.

Figure 3:
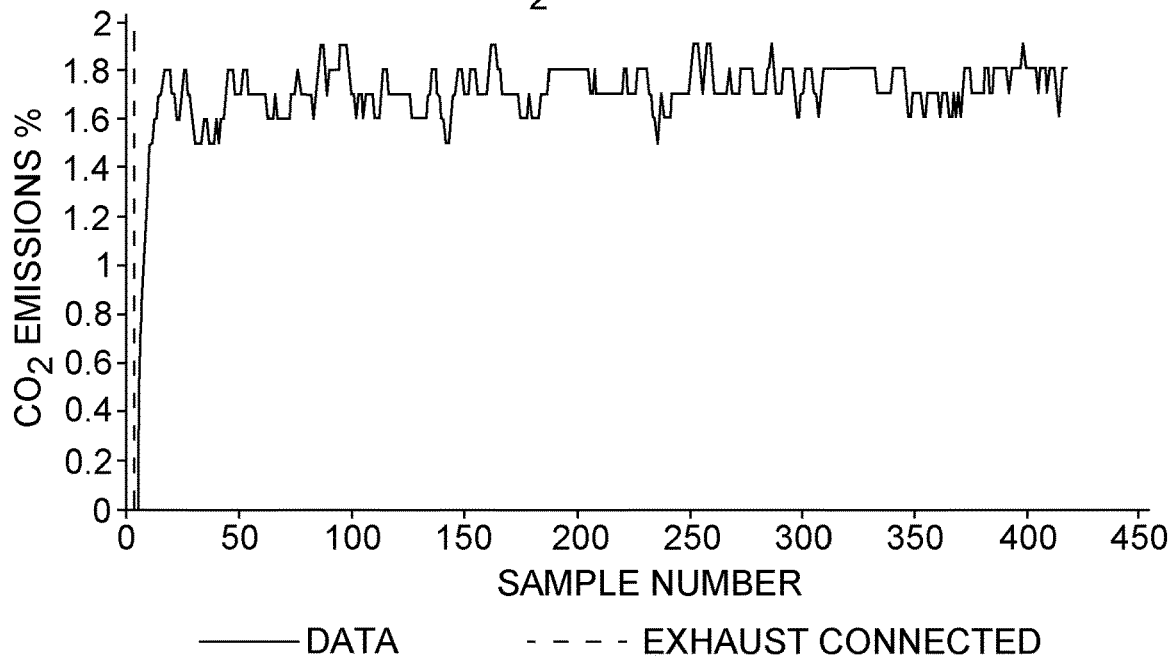
FIGS. 3 to 10 present graphically the results of such test.

The results for the ARCS off test are summarised in the following figures:
FIG. 3: $CO_2$ emissions ARCS off
FIG. 4: $O_2$ emissions ARCS off
FIG. 5: CO emissions ARCS off
FIG. 6: NO emissions ARCS off The analyser was introduced into the exhaust at sample 3. Allowing for a 20*s* analyser response delay a mean value for each of the emissions constituents can be calculated between sample 23 and sample 418. These are set out in table 1.

TABLE 1

ARCS off mean emissions
Constituent Mean (Sample 23-418):

| | |
|---|---|
| $CO_2$ % | 1.72 |
| $O_2$ % | 18.26 |
| CO % | 0.018 |
| NO ppm | 126.53 |

Figure 7:
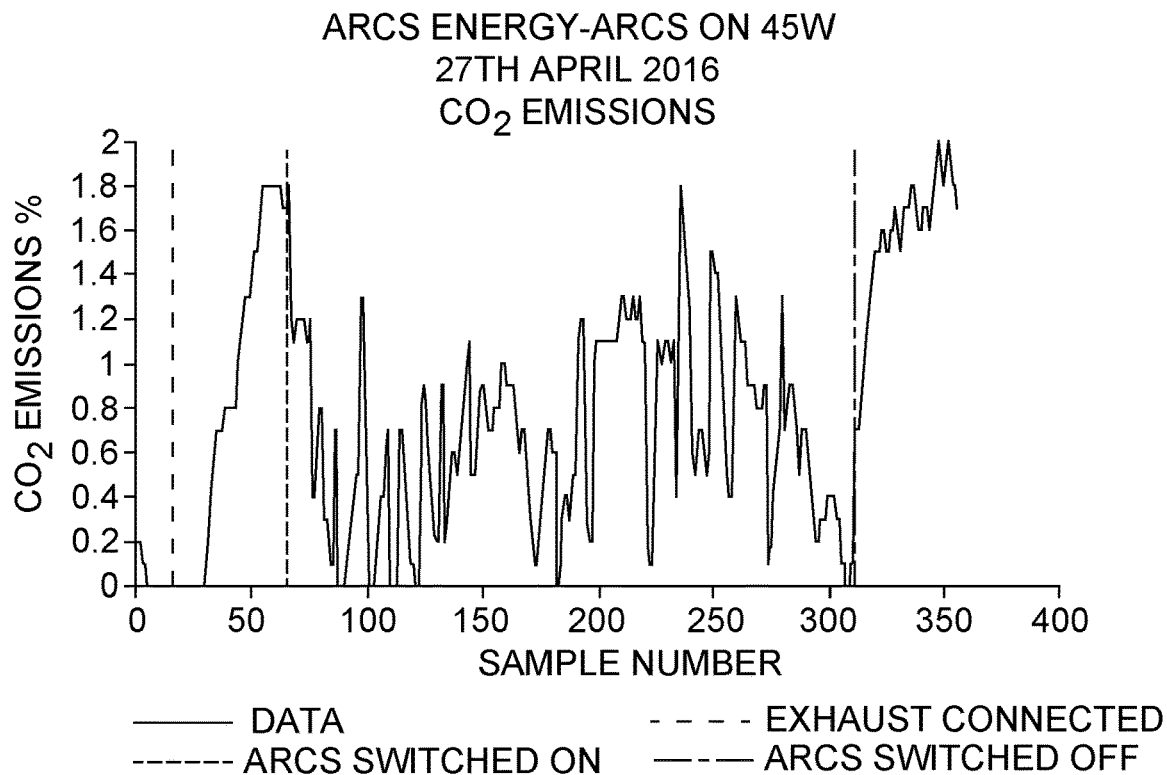
Figure 8:
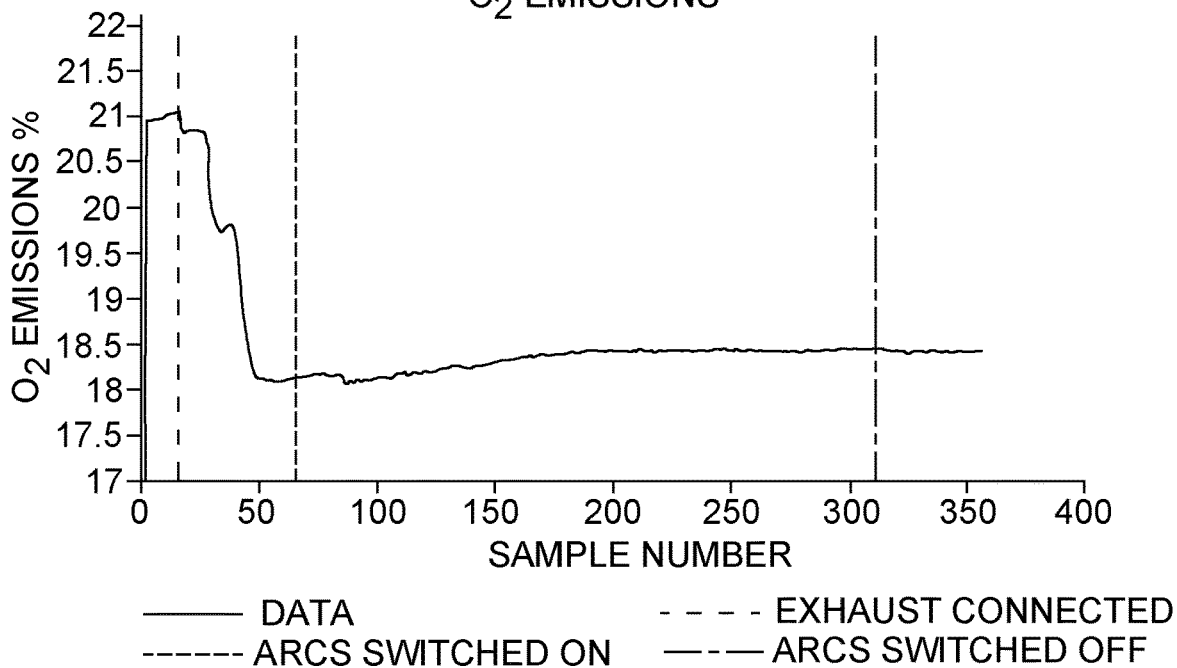
Figure 9:
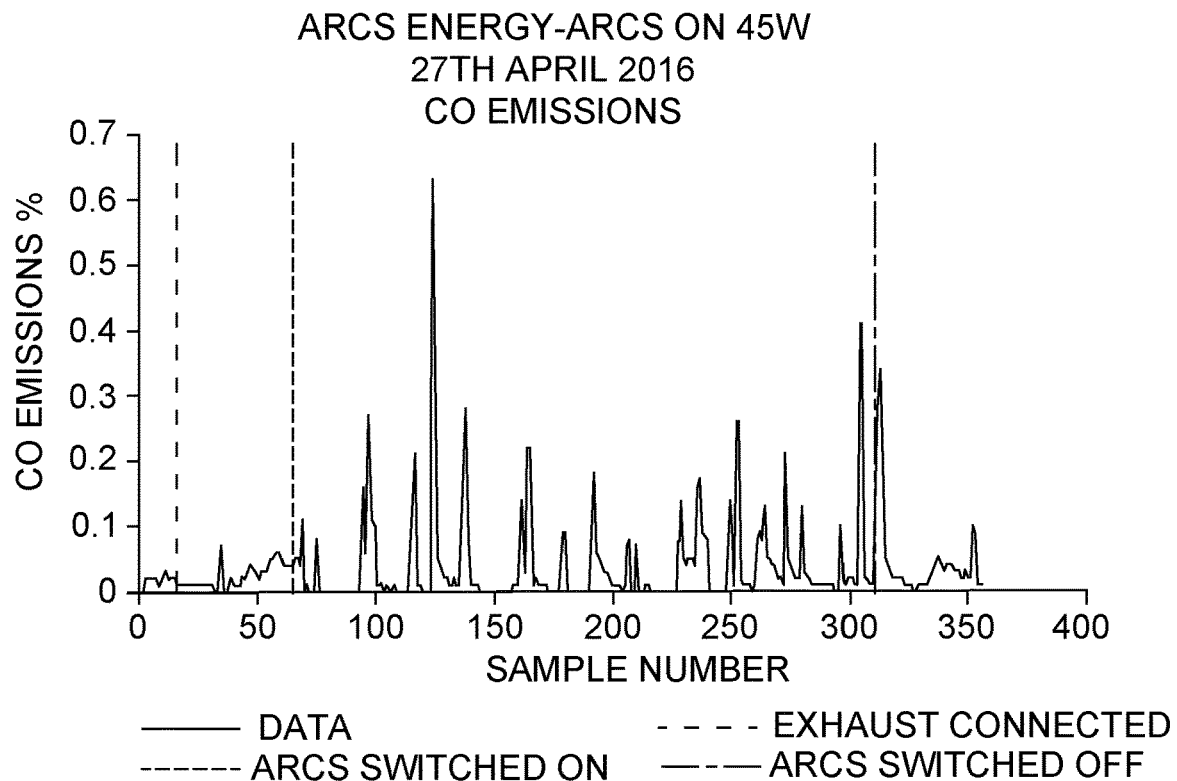
Figure 10:
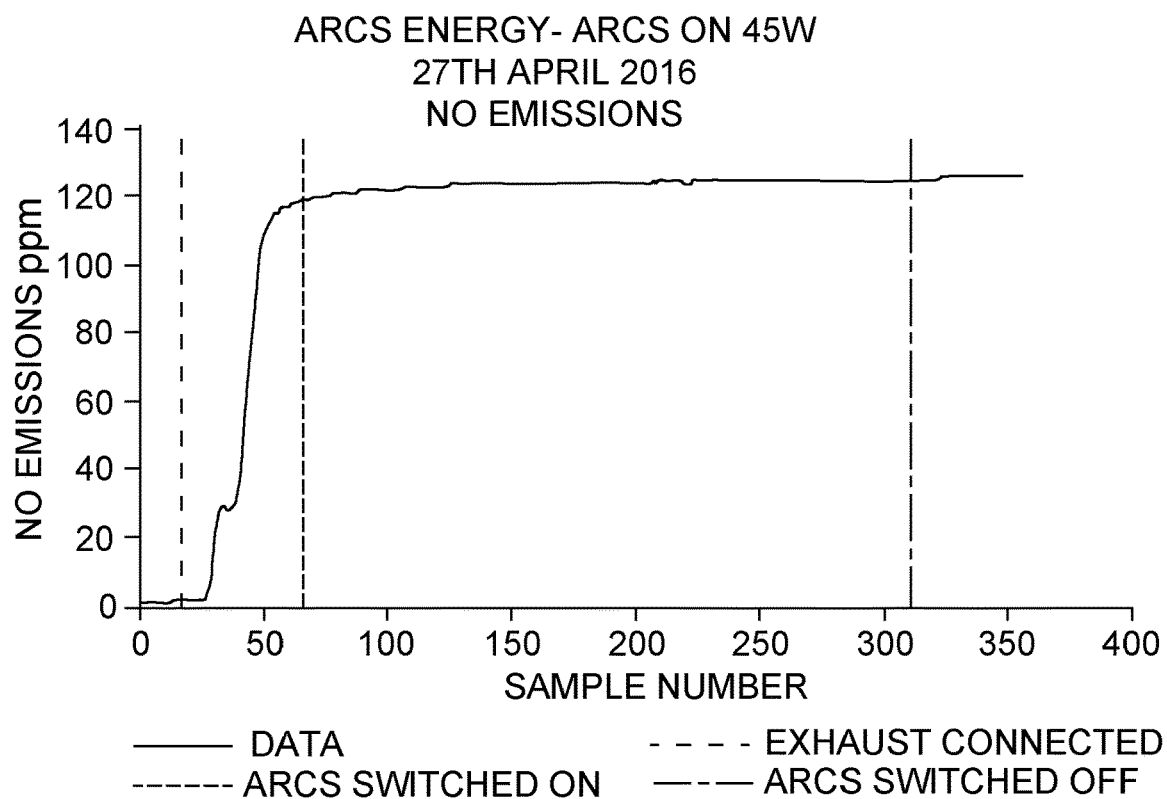

The results for the ARCS on test are summarised in the following figures:
FIG. 7: $CO_2$ emissions ARCS on
FIG. 8: $O_2$ emissions ARCS on FIG. 9: CO emissions ARCS on
FIG. 10: NO emissions ARCS on The ARCS device was switched on at sample 65 and off at sample 311. Allowing for a 20s analyser response delay a mean value for each of the emissions constituents can be calculated between sample 85 and sample 310. These are set out in table 2.

TABLE 2

ARCS on mean emissions
Constituent Mean (Sample 85-310)

| | |
|---|---|
| CO2 % | 0.65 |
| O2 % | 18.35 |
| CO % | 0.040 |
| NO ppm | 124.15 |

Comparison of the ARCS off and ARCS on mean emissions show that with ARCS on the CO2 emissions reduce and the CO emissions increase. The CO2 emissions reduction is approximately 62% and the CO emissions increase is approximately 222%. The O2 and NO emission are similar between the ARCS off and ARCS on tests.

Figure 4:
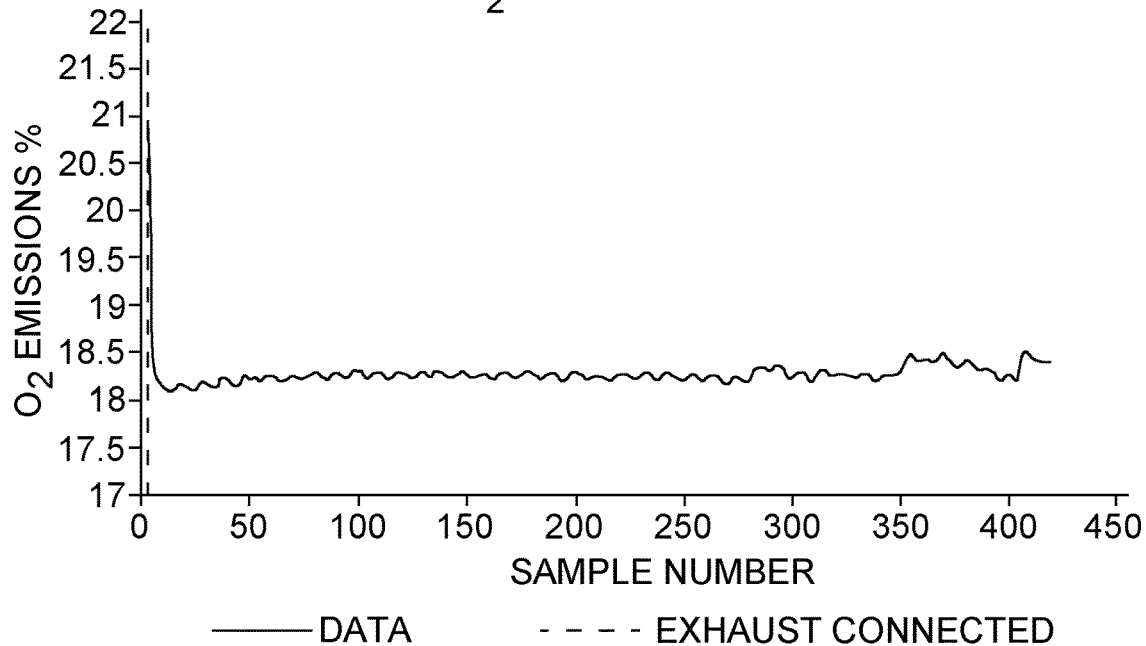
Figure 5:
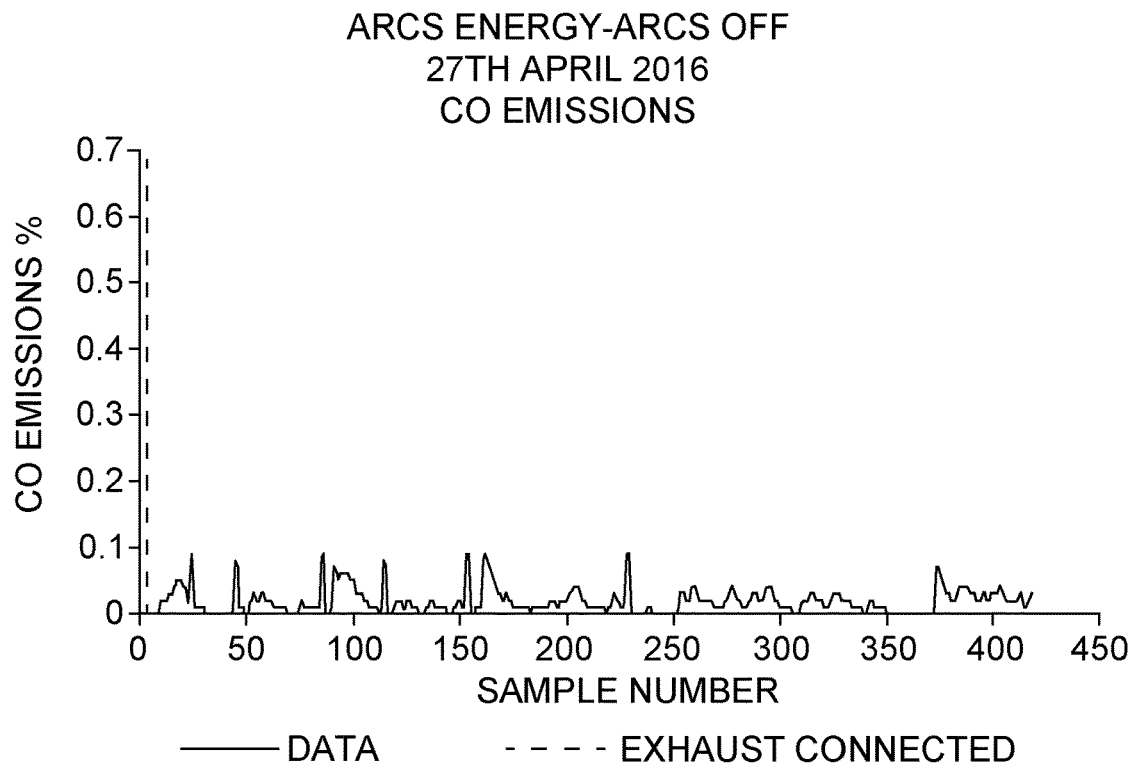

Inspection of the CO2 emissions plots FIG. 4: CO2 emissions ARCS off and FIG. 8: CO2 emissions ARCS on shows that with ARCS on the decrease in mean missions is associated with an increase in variability.

Figure 6:
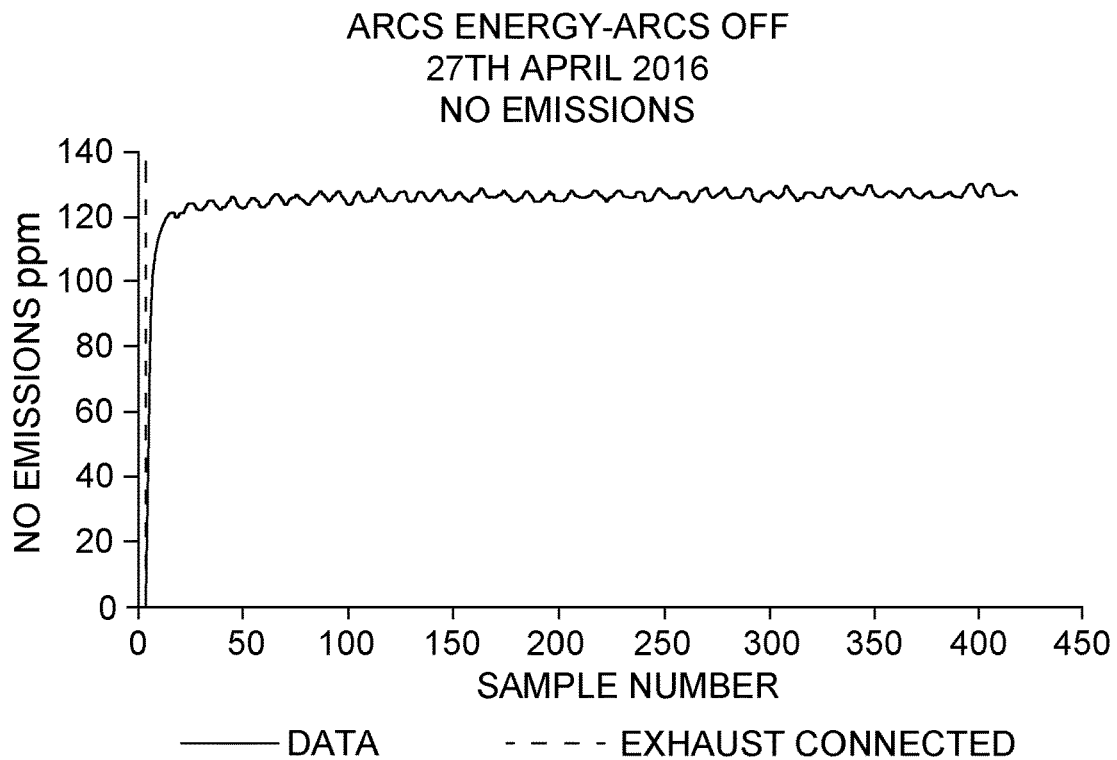

Inspection of the CO emissions plots FIG. 6: CO emissions ARCS off and FIG. 10: CO emissions ARCS on shows that with ARCS on the increase in mean emissions is associated with an increase in variability.

Testing has shown that the ARCS device when running at a modest power level of 45 W has the ability to alter the composition of vehicle exhaust emissions as detected by a proprietary workshop 5 gas exhaust emissions analyser. A Reduction of 62% in CO2 emissions and an increase of 222% in CO have been observed. To place the CO emission increase in context petrol engine vehicles are subject to an idle CO emissions test during a UK MOT test. At normal idle the CO emissions must be below 0.3%. As the test work has been carried out on a diesel engine vehicle with inherently low idle CO emissions even with the increased CO emissions the figures are still well below the petrol limits.

In another example, an array assembly of an apparatus embodying the principles of the apparatus 100 may be provided in the flue gas stack of a power plant to "clean up" the flue gases. In particular, the array assembly may be made of a plurality of reactor units of the apparatus 100 of the present invention arranged so as to form an assembly adapted to fit into the chimney of the flue gas stack, wherein the parallelly arranged plurality of reactor units are operably coupled to either one single EMR source, or a plurality of EMR sources, so as to activate the apparatus 100.

Example(s) of Implementation(s) of Embodiment(s) of ARCS into Exhaust Design(s):

When using an embodiment of the apparatus 100 of the present invention, it is important that the power density, the field strength, the gas expansion, the gas re-circulation (spin effect) pressure, and the temperature are maintained according to predetermined specifications (suitable for the fluid substance passing through the ARCS reactor chamber 104, as well as, the microwave energy coupled into the fluid substance. Also, the reactor chamber 104 of the apparatus 100 has to be designed, so as to provide the required fluid flow and pressure. The inner wall of the reactor chamber, as well as, the fluid inlet port and the fluid outlet port are shaped so that fluid substance entering through the fluid inlet port is forced into a continuous spin or loop (swirl flow) when passing through the reactor chamber 104, therefore, maximizing the time of the fluid substance within the energy field, before the fluid substance exits the reactor chamber 104 through the fluid outlet port. Both, the fluid inlet port and the fluid outlet port are adapted to increase the fluid pressure when the fluid substance passes through, wherein the fluid pressure imparted by the inlet port is greater than the fluid pressure imparted by the outlet port, therefore, maintaining a positive gas flow from the fluid inlet port to the fluid outlet port. Furthermore, when the pressurized fluid substance enters the reactor chamber 104, a sudden expansion of the fluid may cause the fluid substance to cool down (Joule-Thompson effect).

Figure 23:
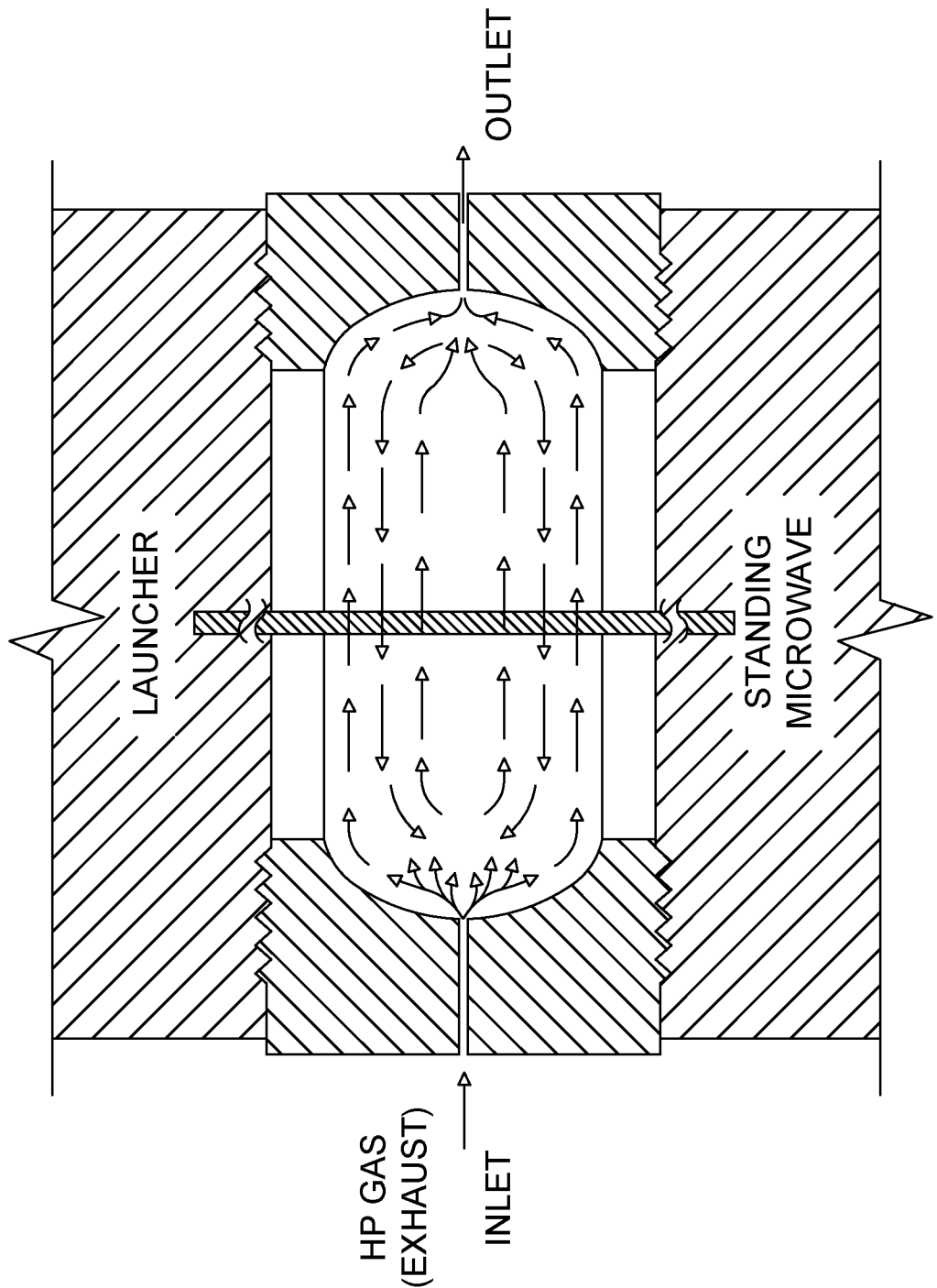
FIG. 23 is a simplified schematic illustration of the reactor chamber of an example exhaust including an embodiment of ARCS, showing the fluid flow between inlet and outlet port.

An example embodiment of the reactor chamber is shown in FIG. 23. Here, the possible fluid flow is indicated by the arrows circling (swirling) around the waveguide (i.e. launcher). However, it is understood by the person skilled in the art that any other reactor chamber (i.e. design of the inner wall) suitable for forcing the entering fluid into a spin or swirling flow before exiting the chamber, may be used.

Figure 11:
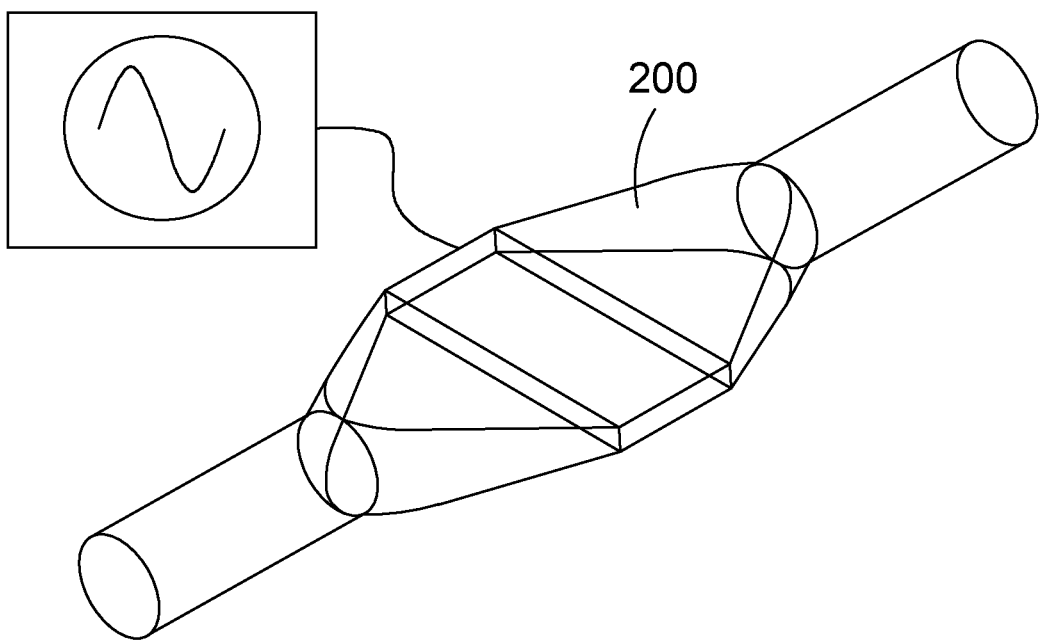
FIG. 11 is an illustration of a test set-up of microwave performance within an exhaust.

In one example embodiment, the apparatus 100 of the present invention is operably implemented within an exhaust 200. To be able to demonstrate the advantages provided by the apparatus 100, an exhaust is first tested on its own to show how moisture may affect microwave performance. In the example test shown in FIG. 11, no gas measurement reading changes were observed. The power delivered was 100 W.

Figure 12:
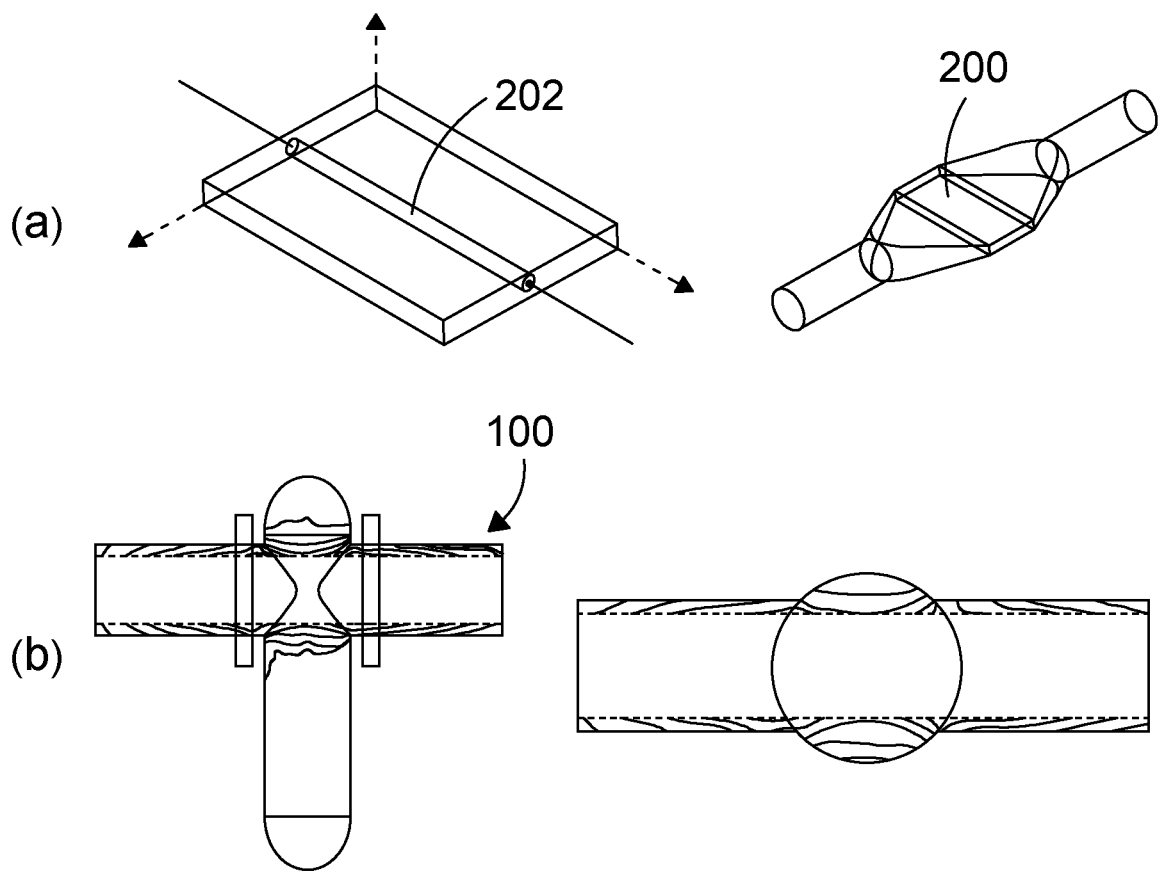
FIG. 12 is an illustration of energy field distribution in an exhaust comprising (a) a waveguide (diameter 15 mm) and (b) the ARCS device of the present invention (diameter of waveguide 15 mm)

Referring now to FIG. 12, energy field distribution in (a) the exhaust waveguide 202 (15 mm) and (b) the ARCS waveguide are compared. In the illustrated example, the ARCS waveguide power to volume ratio 50 to 100 times greater compared to the exhaust.

Figure 14:
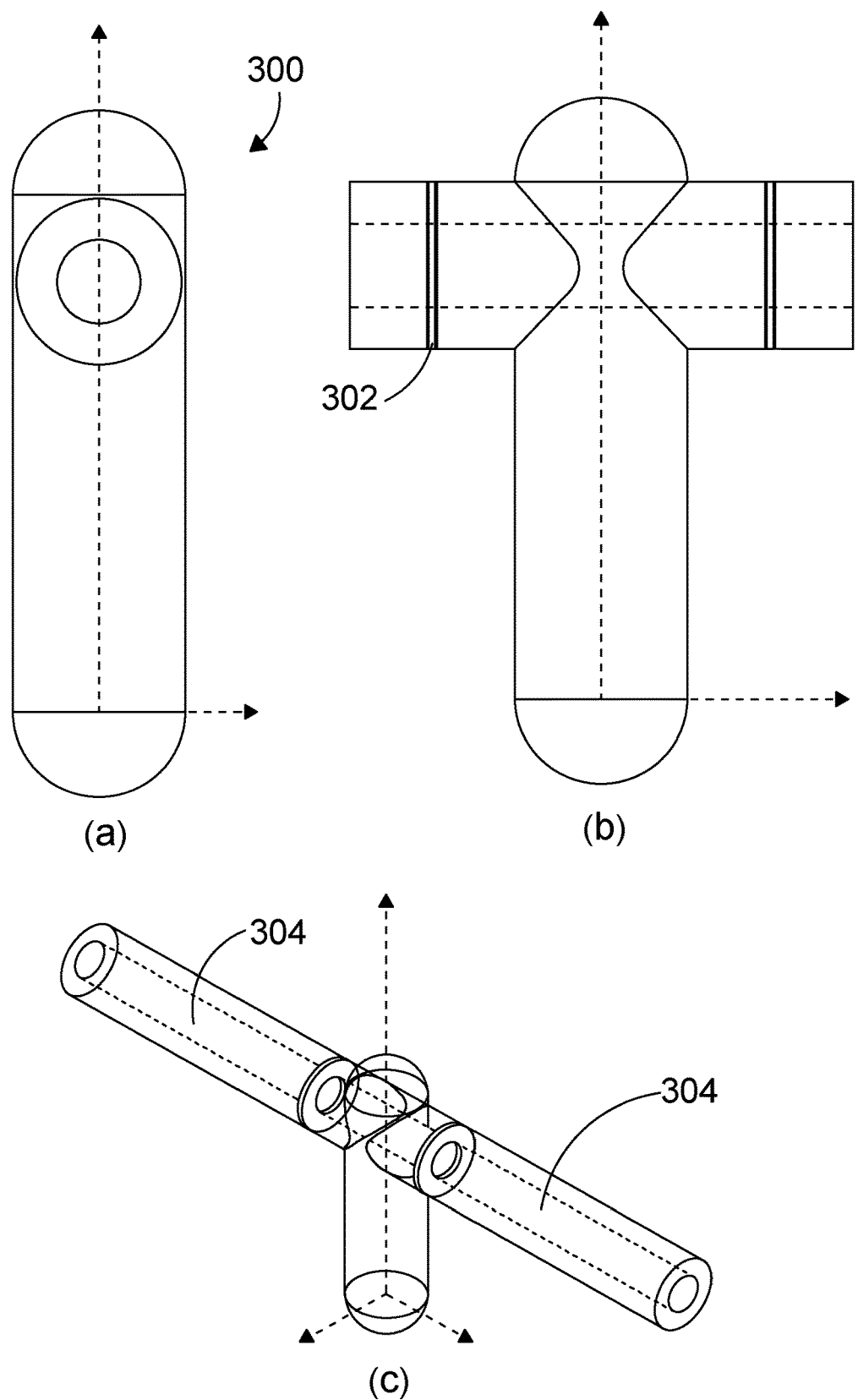
FIG. 14 is an illustration of an example embodiment of a modular ARCS device, where Mica discs are used to couple the ARCS reactor chamber to respective waveguides, (a) front view, (b) side view and (c) semi-transparent perspective view.

(i) Modular ARCS Assembly:

In case a modular design of the apparatus 300 is used, mica plugs 302 become the interconnecting plugs and also allow one waveguide 304 to be used connecting all modules. This may aid reducing manufacture costs and also maintains a low energy consumption unit. An example of such a modular unit 300 is shown in FIG. 14.

Figure 15:
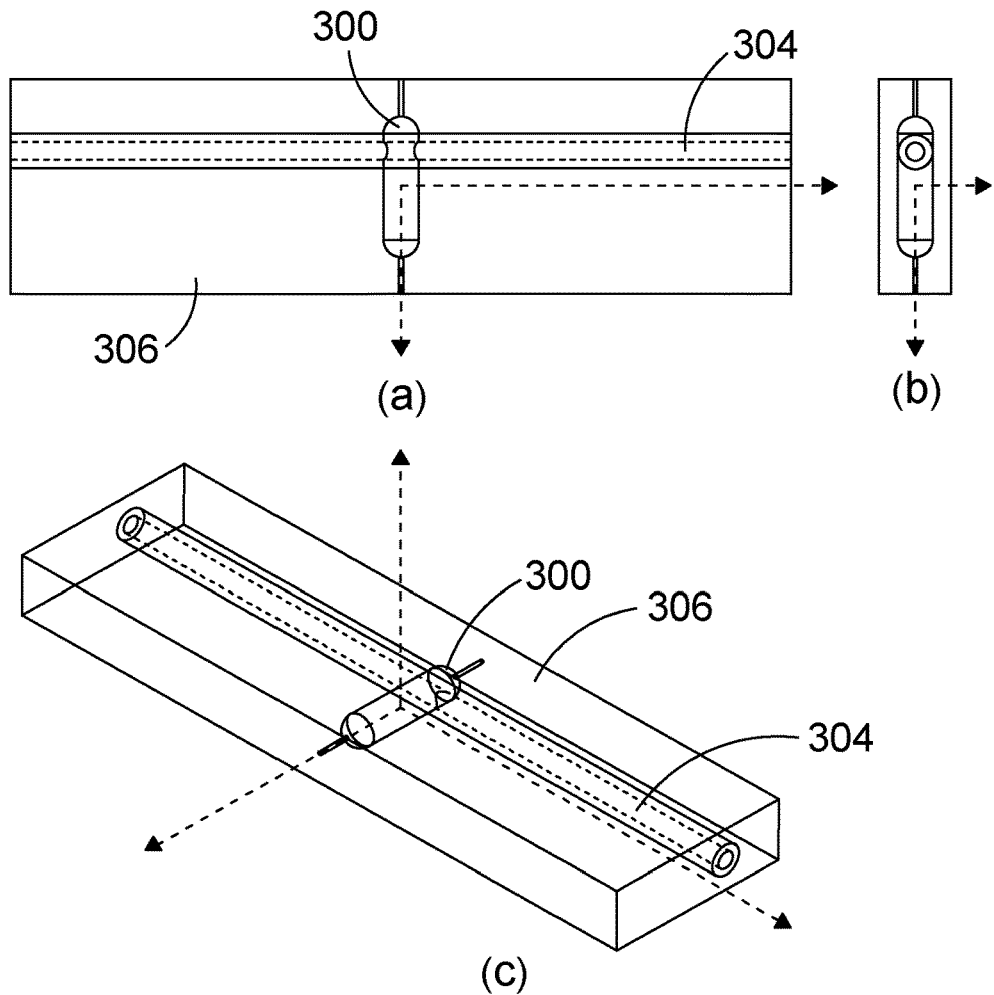
FIG. 15 is an illustration of an ARCS device reactor chamber operably coupled to a waveguide installed in a block member suitable to be installed within an exhaust, (a) semi-transparent top view, (b) semi-transparent side view and (c) semi-transparent perspective view.
Figure 16:
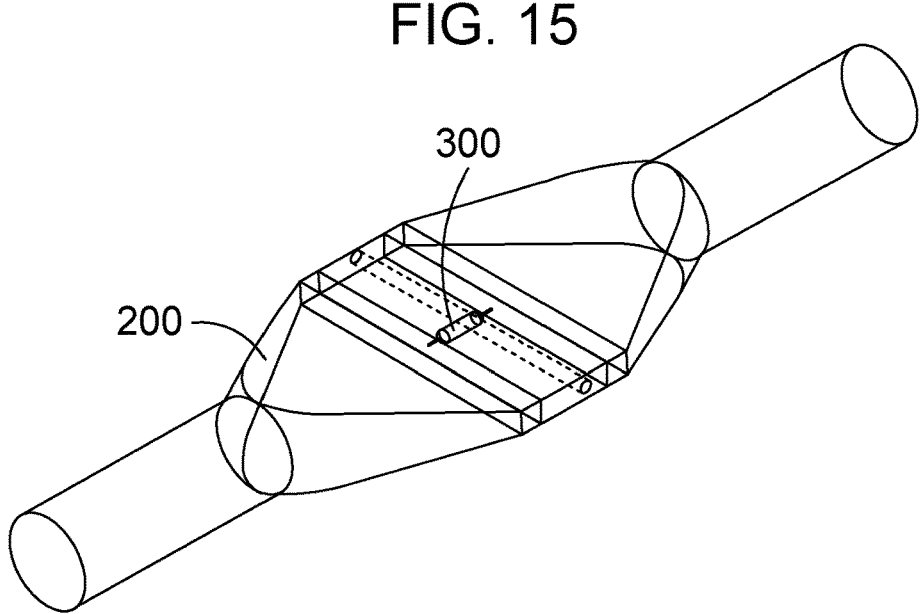
FIG. 16 is a perspective illustration of an example exhaust comprising the block member shown in FIG. 15.

FIG. 15 shows an embodiment where a single modular apparatus 300 (reactor chamber unit only) is operably coupled to a waveguide 304 that is installed within a block 306 suitable to fit within an exhaust 200. The assembly within an exhaust 200 is shown in FIG. 16.

Figure 17:
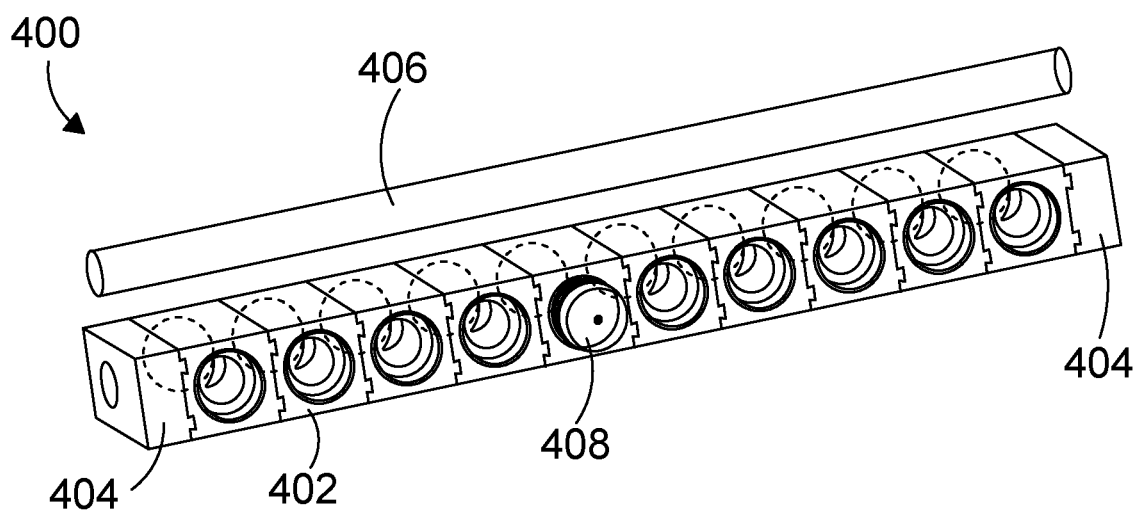
FIG. 17 is an illustration of an ARCS module chamber assembly, comprising ten operably coupleable ARCS modules, two end plates and a central rod.
Figure 18:
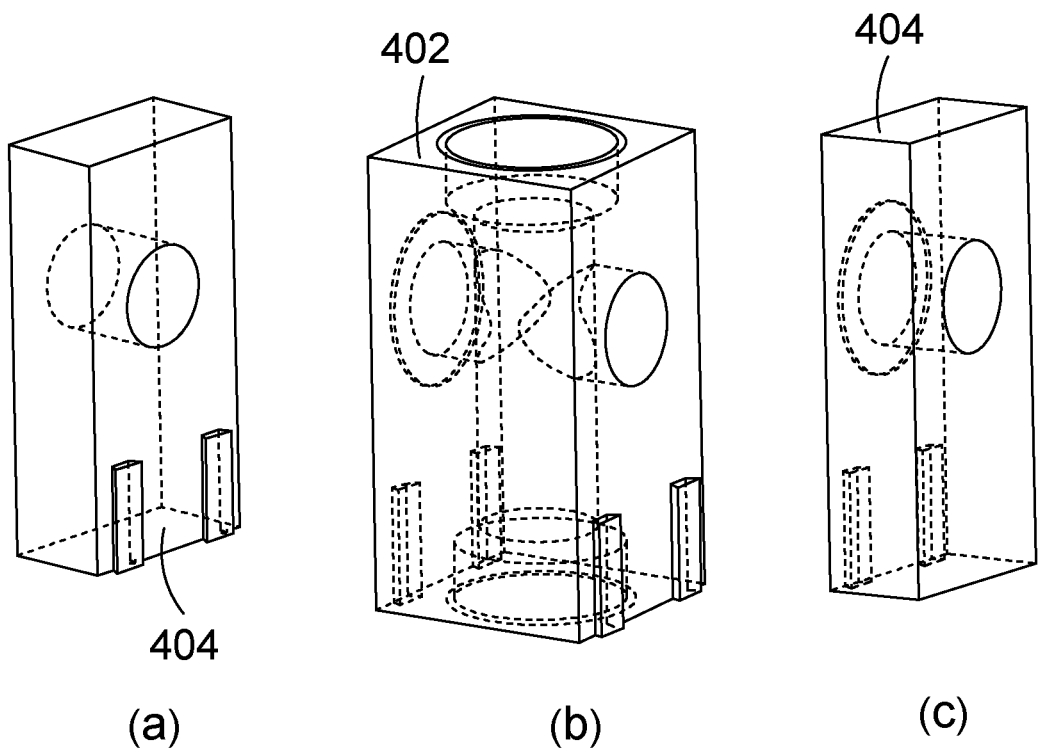
FIG. 18 is an illustration of a disassembled ARCS module and two end plates of the ARCS module chamber assembly shown in FIG. 17.

An assembly 400 of ten interconnected modular apparatuses 402 is shown in FIG. 17. Two end plates 404 are provided at respective ends of the assembly 400. A suitable waveguide 406 is provided to be inserted through respective holes of the interconnected modular apparatuses 402. Respective plugs 408 are used to act as fluid inlet and fluid outlet ports. FIG. 18 shows an example embodiment of a single unit of an interconnectable modular apparatus 402 and each end plate 404. In use, the assembly 400 is provided within a block 306 that is then installed within exhaust 200.

Figure 19:
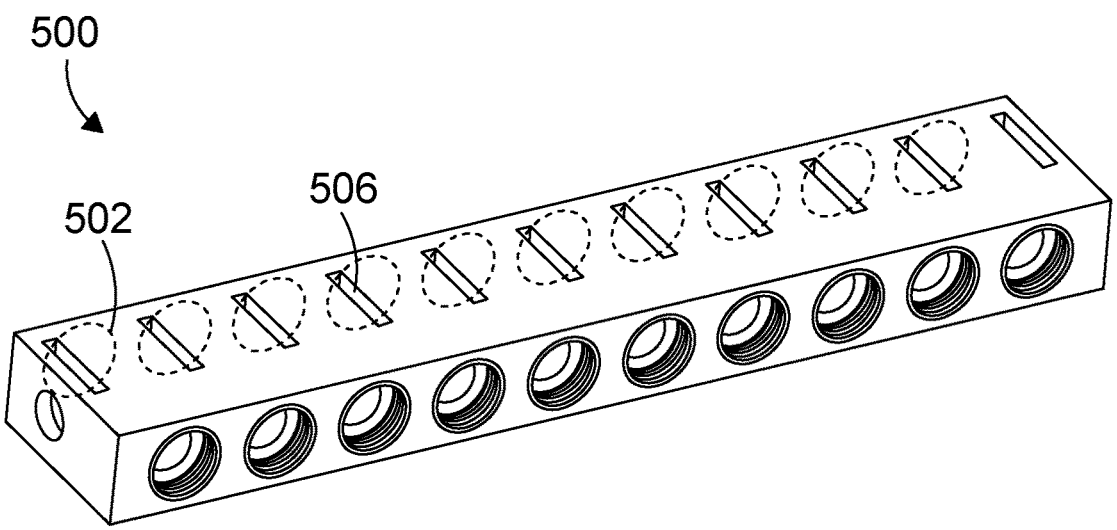
FIG. 19 is an illustration of an alternative embodiment of the ARCS module shown in FIG. 17, which is manufactured from a single block of material.
Figure 20:
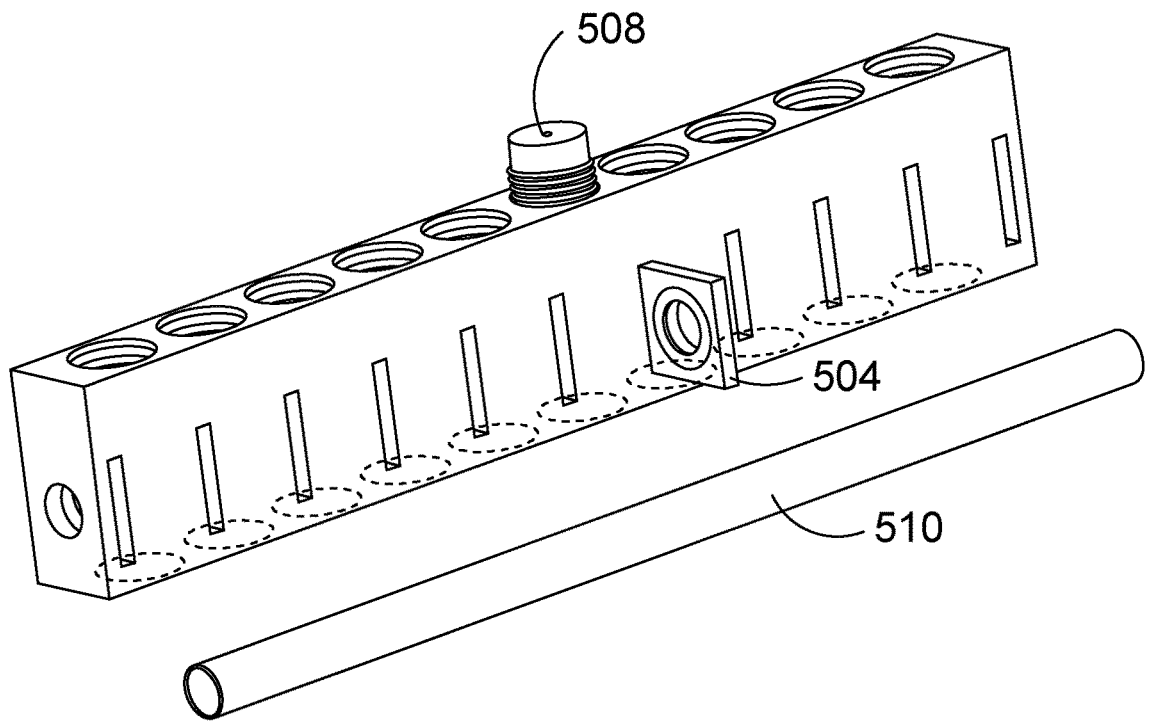
FIG. 20 is an illustration of the ARCS module of FIG. 19, exploded view, further showing an example plug and an example Mica disc, as well as a central rod.

(ii) Single Piece ARCS Module:

FIGS. 19 and 20 show an example embodiment of a module 500 comprising a plurality of apparatuses 502. The module is made of a single piece of material (e.g. metal), so as to improve overall assembly strength and ease of use. As shown in FIG. 20, the mica discs 504 are introduced through respective slots 506 machined into the module 500. Respective plugs 508 are screwed into the fluid inlet and fluid outlet of each reactor chamber, and a central waveguide 510 passes through the whole length of the module 500.

Figure 21:
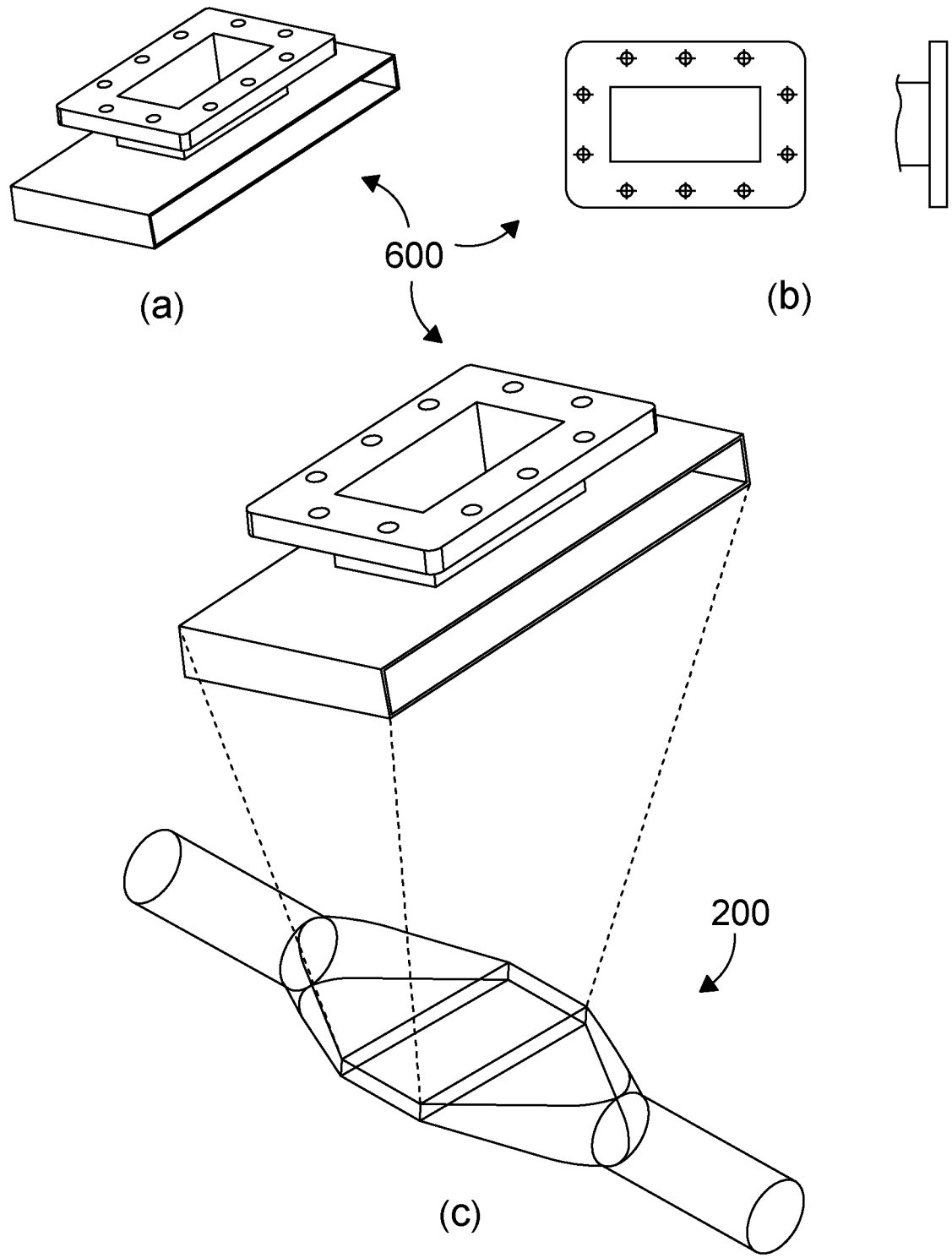
FIG. 21 is an illustration of an alternative embodiment of the present invention (no waveguide outlet port) where a flange is welded to the mid-portion of an exhaust, (a) sectioned perspective view, (b) top view and (c) exploded view.
Figure 22:
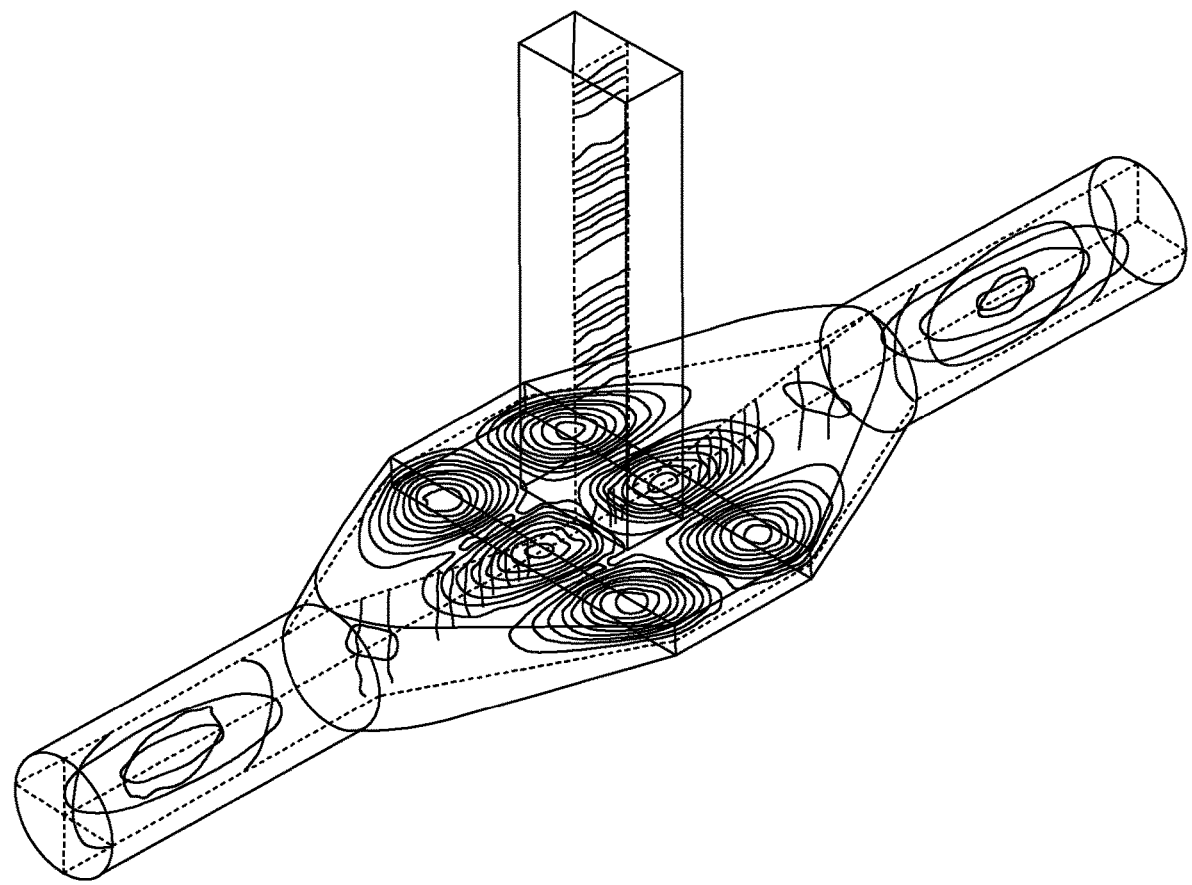
FIG. 22 shows an illustration of the electric field distribution within an exhaust with direct T-shaped feed during use.

In yet another embodiment, the waveguide may be provided via a T-shaped feed (see FIG. 22) that is provided by a suitable flange portion 600 (see FIG. 21). The flange portion 600 may be welded to the exhaust 200. A typical energy field distribution provided by a T-shaped feed into the exhaust 200 is shown in FIG. 22.

(iii) Specific Example of Assembly and Tuning for an Exhaust System (e.g. Car Exhaust):

A 2.45 GHz microwave generator is set between 10 W and 100 W for testing. Common settings used during testing may be between 25 W to 45 W, but may also be 100 W. A 50 Ohm microwave coaxial cable connects the microwave generator to the ARCS unit inside the exhaust's outer casing. Some energy (e.g. 1.3 dB) may be lost inside the microwave cable. This is expected and accounted for in the testing.

During assembly and testing, the microwave cable has to be routed carefully to avoid damage or excessive bending, kinking of the cable. These cables a specified with a minimum bend radius. In the event the cable is not handled appropriately, a mismatch can occur down the length of the cable, which will result in energy being dissipated into the cable at a local point. This may result in cable damage, reduced power delivery to the ARCS unit, which will affect or stop the ARCS unit from operating correctly.

Cable damage may be determined using the value of reflected microwave power displayed on the generator. A low reflected power (e.g. <10 W) shows that energy is going into the ARCS unit correctly. A high reflected power means that the cable may be damaged.

As discussed previously, the ARCS unit may consist of a plurality of ARCS chambers. Specific dimensions of the ARCS chamber for this implementation of the invention are provided below. Also, the size and shape of the extended launcher (waveguide) and the mica disc is provided. The purpose of the mica disc is to prevent fluids passing between adjacent ARCS chambers inside an ARCS unit. The extended launcher (i.e. waveguide) is described in the invention as the means to introduce microwave energy into the ARCS chamber.

Figure 24:
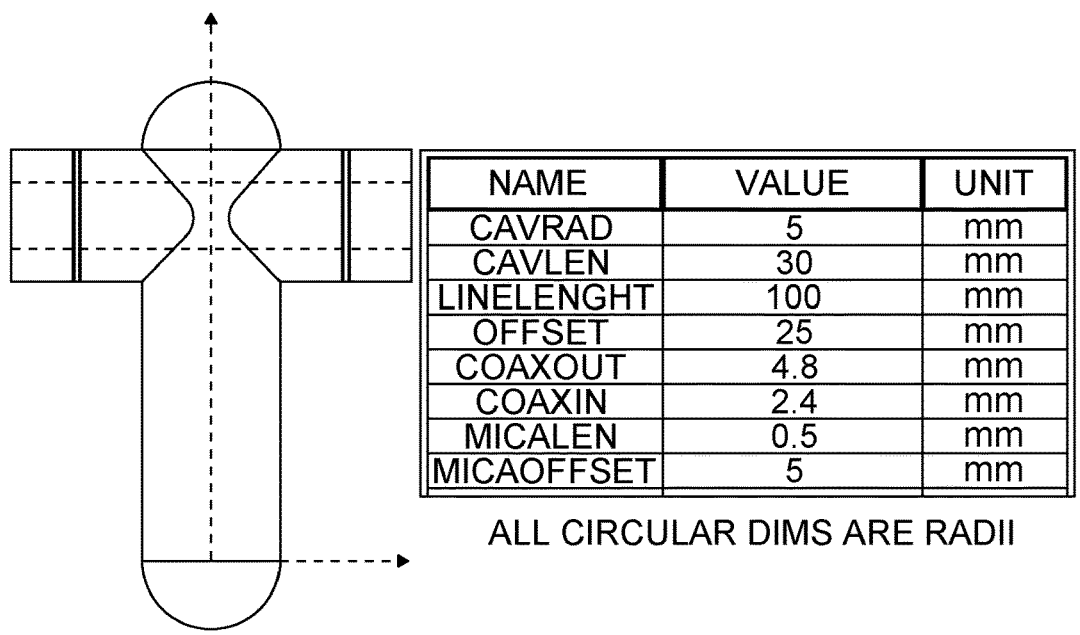
FIG. 24 shows an example embodiment and its specific dimensions of the fluid treatment apparatus that is suitable to be incorporated into an exhaust system.

Specific dimensions of the ARCS chamber are shown in FIG. 24, i.e.:

Chamber radius is 5 mm
Chamber length is 30 mm
Gas inlet and outlet radius is 0.5 mm The gas inlet and outlets are the means by which gases are allowed to enter and to exit each ARCS chamber. The preferred ratio of chamber radius to the inlet/outlet radius may be 10:1.

Figure 25:
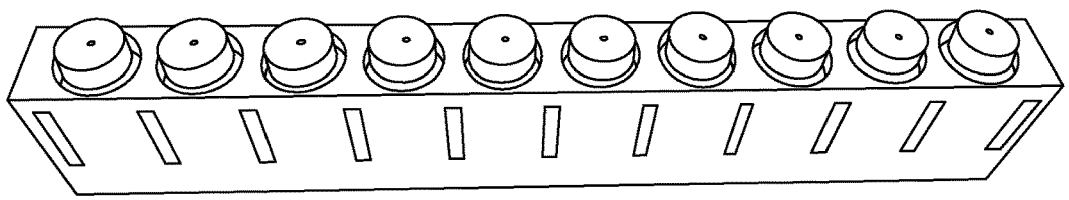
FIG. 25 shows an example ARCS block with eleven chambers.

FIG. 25 shows an example embodiment of the ARCS block, which consists of eleven ARCS chambers. In this example embodiment, the ARCS block is machined from a single metal block.

Figure 26:
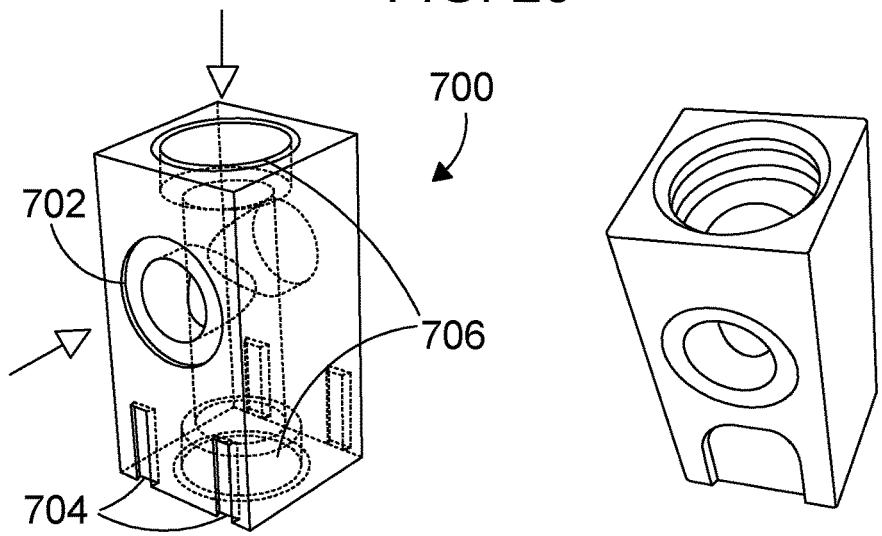
FIG. 26 shows a schematic illustration and image of an example modular segment suitable for assembly into an array of predetermined length.

As already described, another embodiment of the ARCS block can be constructed from separate, interlocking segments that, when assembled, give the same overall shape and function as the machined single block design. One of these interlocking segments is shown in FIG. 26. A segment 700 is presented in a framework view to show its internal structure and an external perspective view. Top and bottom apertures 706 are provided. End caps of different design can be screwed at the top and bottom. A side aperture defines an insert for holding the mica disc 702. The gas flow is in the direction of the downward arrow through the top of the two apertures 706 and microwave CAV direction is shown by the side arrow. Slots 704 are provided for fixing adjacent modules.

Figure 27:
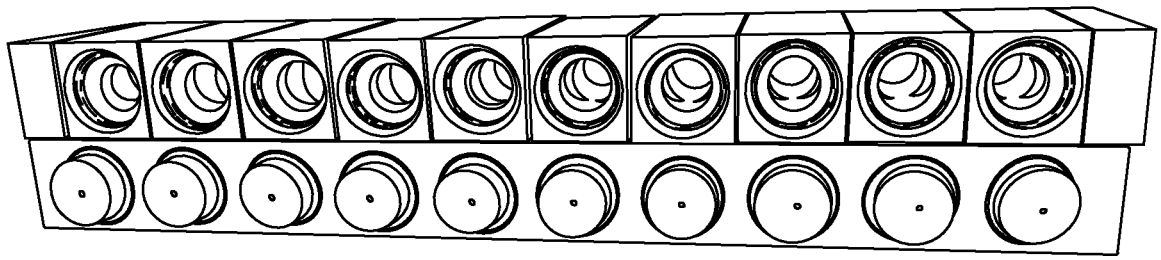
FIG. 27 shows images of two different ARCS arrays, a single block including ten chambers, and a block assembled from ten modular segments.

FIG. 27 shows a direct comparison between the segment assembly (on top) and the solid block design (below).

Figure 28:
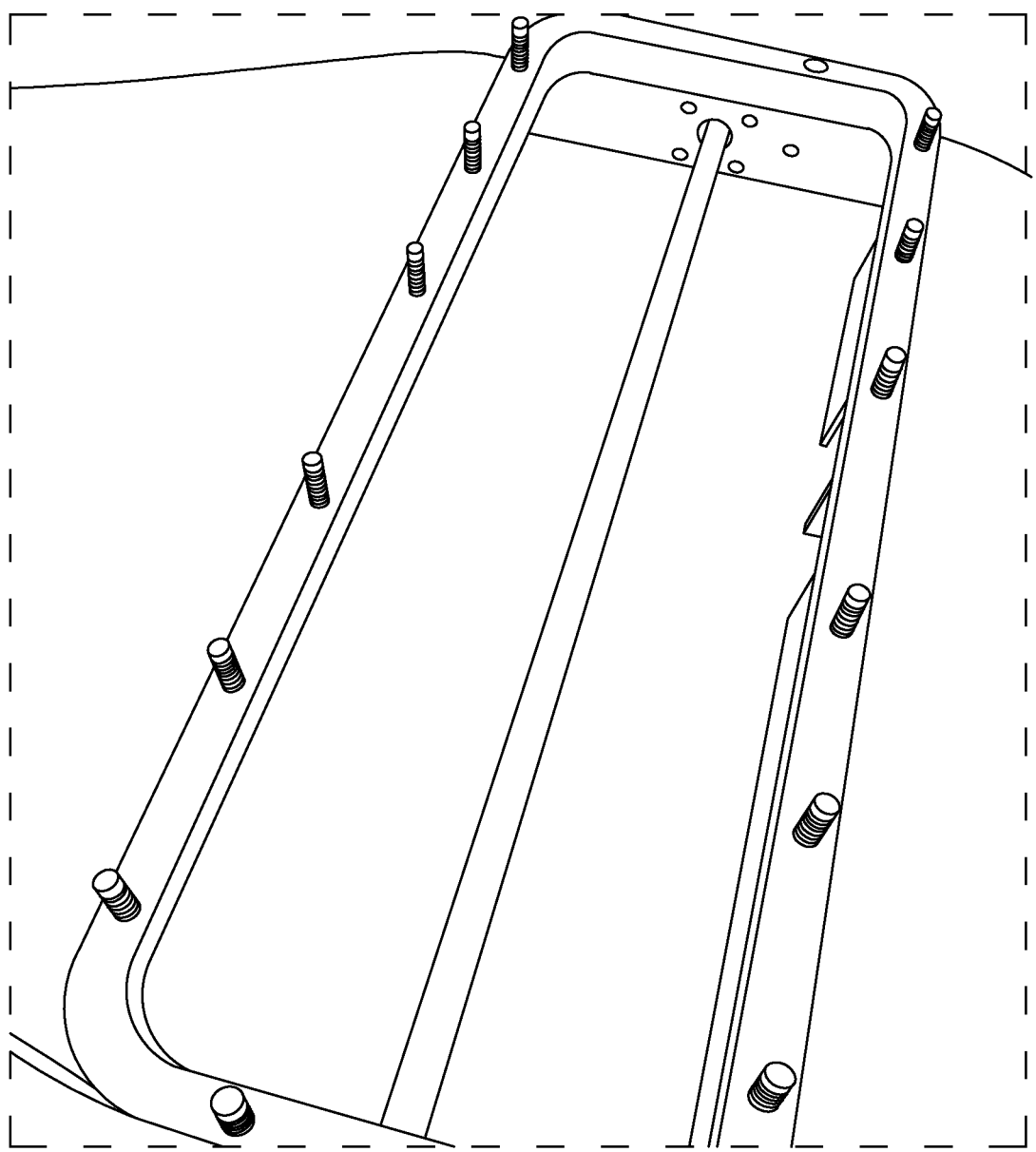
FIG. 28 shows the waveguide (also called extended launcher) provided in an exhaust system (ARCS block not shown)

FIG. 28 shows the waveguide (i.e. extended launcher) implemented into an exhaust (without the ARCS unit). The purpose of the extended launcher is to deliver microwave energy into a single ARCS chamber or each one of the plurality of ARCS chambers (i.e. ARCS block design).

Figure 29:
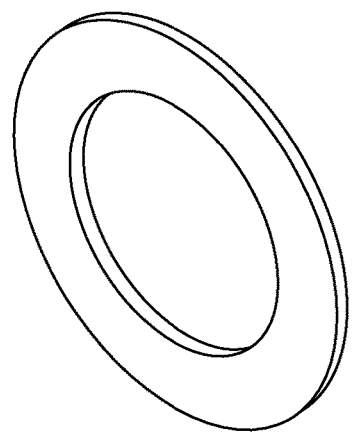
FIG. 29 shows an illustration of a Mica disc.

FIG. 29 shows and example of a mica disc. The purpose of the mica disc is to prevent fluid from passing between interconnected, adjacent ARCS chambers. The mica disc therefore provides a physical barrier to the fluid or liquid, but its material properties are such that the mica disc is relatively 'invisible' (i.e. non-reactive) to the microwave field. So, a single microwave source and extended launcher can feed microwave energy into multiple ARCS chambers.

Figure 30:
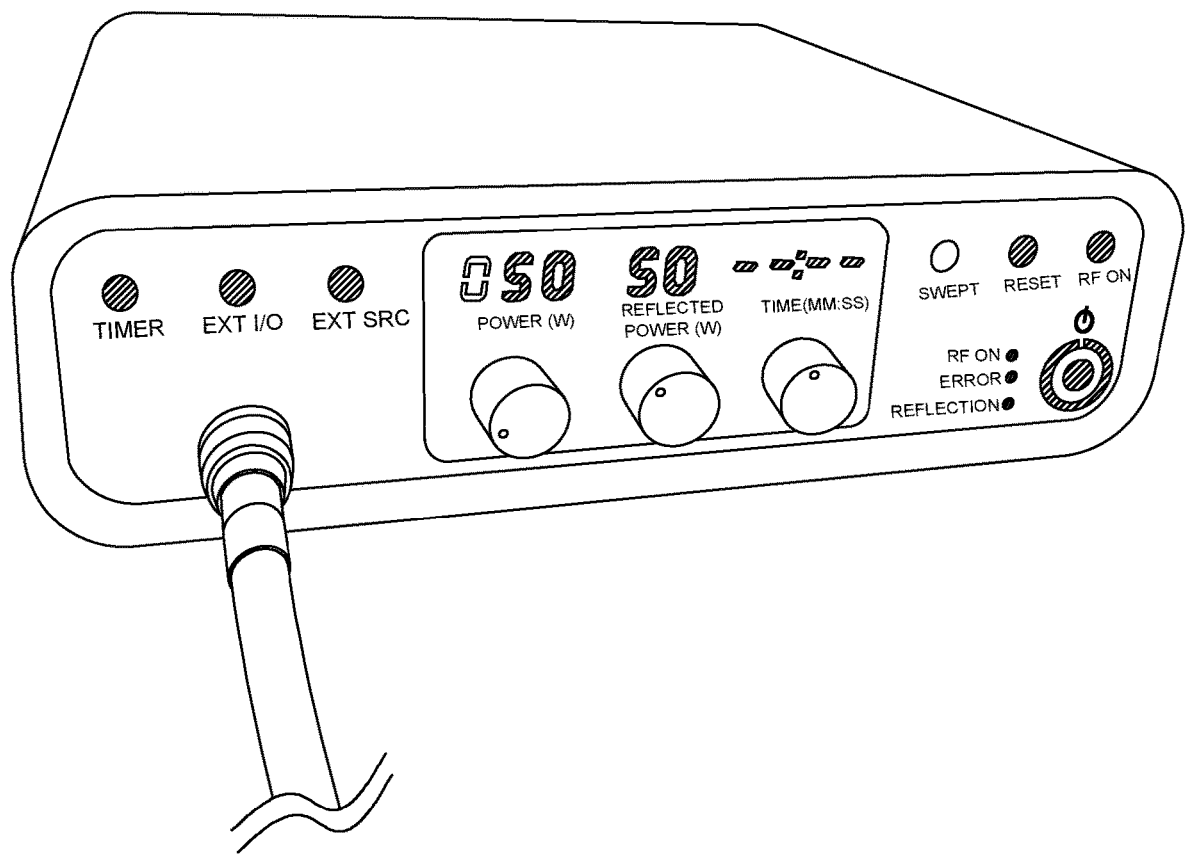
FIG. 30 shows an image of an example embodiment of the microwave generator.

FIG. 30 shows an example embodiment of the microwave generator. The microwave generator is typically set up before testing, so as to ensure that the microwave energy delivery into the ARCS unit is suitable. Setup includes an initial power run for a few minutes to allow the generator to warm up. The generator is set to the required power level and then the power is activated with the START/STOP switch. The display will show if the reflected power is low, indicating that the system microwave energy delivery to the ARCS unit is correct and within operating parameters. However, if the reflected power is high, an inspection and removal of possible errors is required. Typical root causes of a high reflected power is either a damaged microwave coaxial cable or the assembly of the ARCS unit is faulty.

During normal operation, the microwave generator will deliver power to the ARCS unit at a steady rate and with significant fluctuations or changes in reflected power.

In one embodiment of the present invention, the laboratory grade microwave generator shown in FIG. 30 may be replaced with a lower cost and custom designed version that is suitable for the end consumer product.

Referring now to FIGS. 31 to 44, the individual assembly steps are described.

Figure 31:
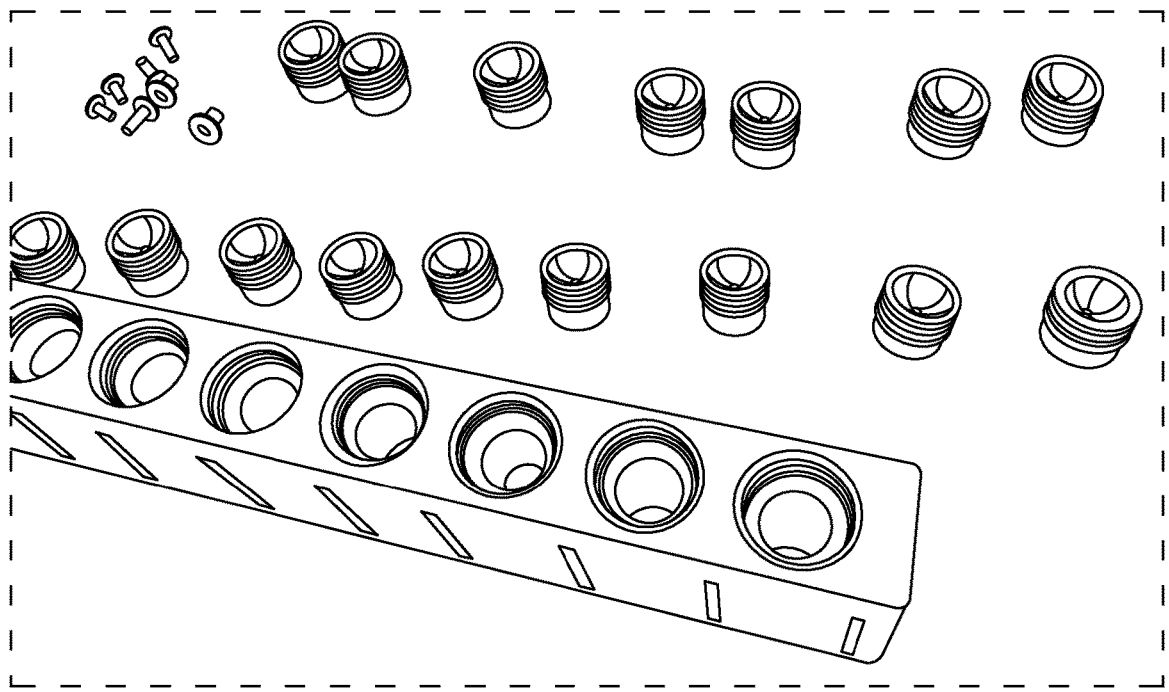
FIGS. 31 to 44 show images of individual steps during the assembly of the exhaust system incorporating the ARCS block.

Step 1—Component Preparation (FIG. 31)

Starting with the block, keep it on clean surfaces as you do not want oil grease or dirt or any substance which can interfere with the microwave field generated from the launcher, anything polar (substance which will absorb the microwave energy) will stop the ARCS unit working.

Figures 32A, 32B:
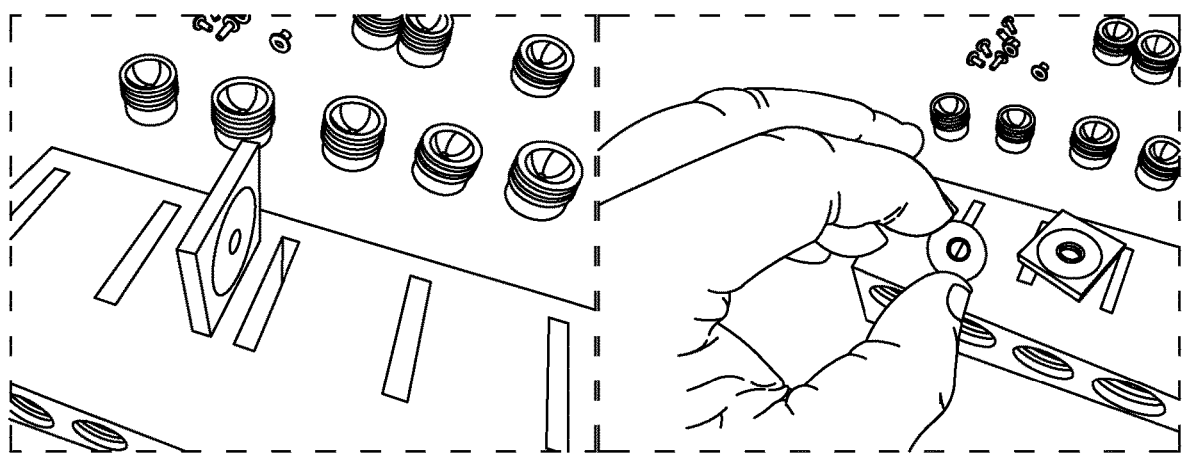

Step 2—Add the Mica Disk (FIG. 32)

The mica disc should be placed in the mica disc holder first, then the holders slide into position. You want a snug fit, as the mica disc becomes not just a reflective surface but also a seal.

Figure 33:
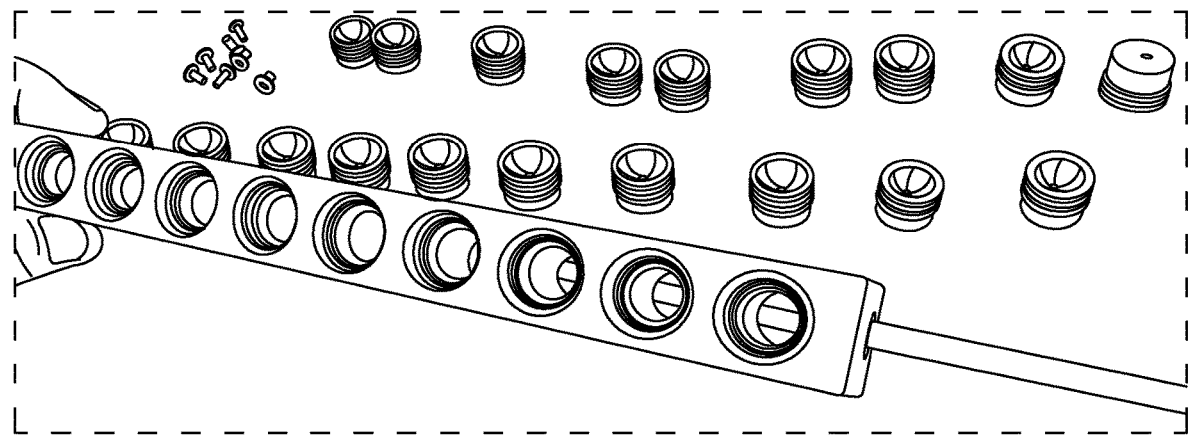

Step 3—Insert the Extended Launcher (FIG. 33)

Once all the mica disc holders are in place, the extended launcher (waveguide) can be pushed through the centre hole of the mica discs. This should be a tight fit. You can watch the launcher as it is pushed into place passing through the mica discs. You can also watch alignment as you do not want disfigurement of the mica disc as this may prevent ARCS from working effectively. Also, the extended launcher (waveguide) should sit perfectly central and even throughout the block.

Figure 34:
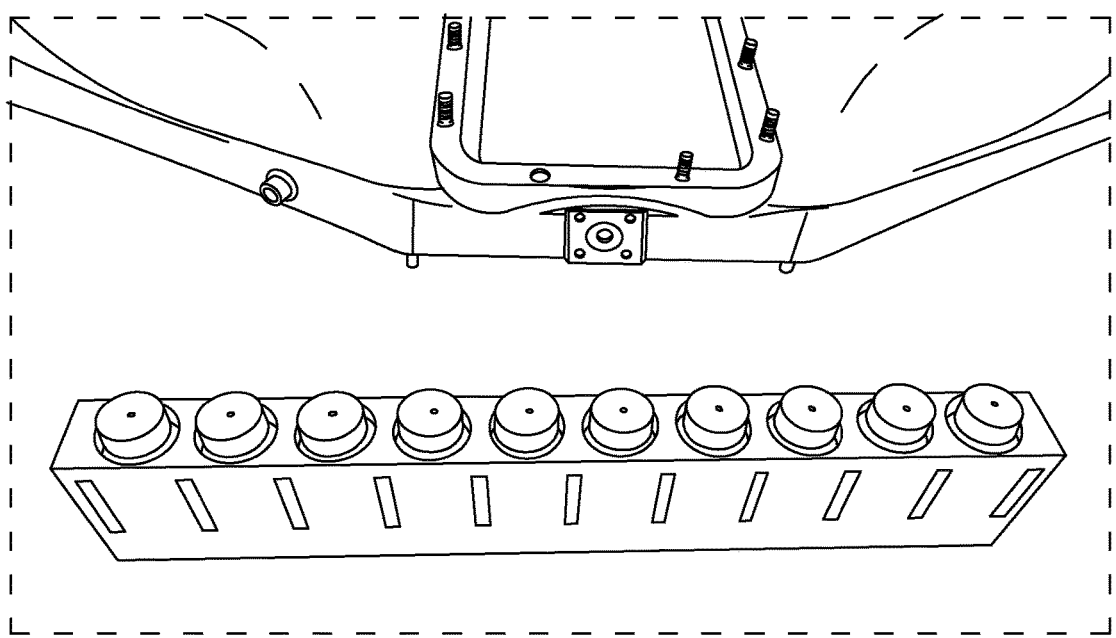
Figure 35:
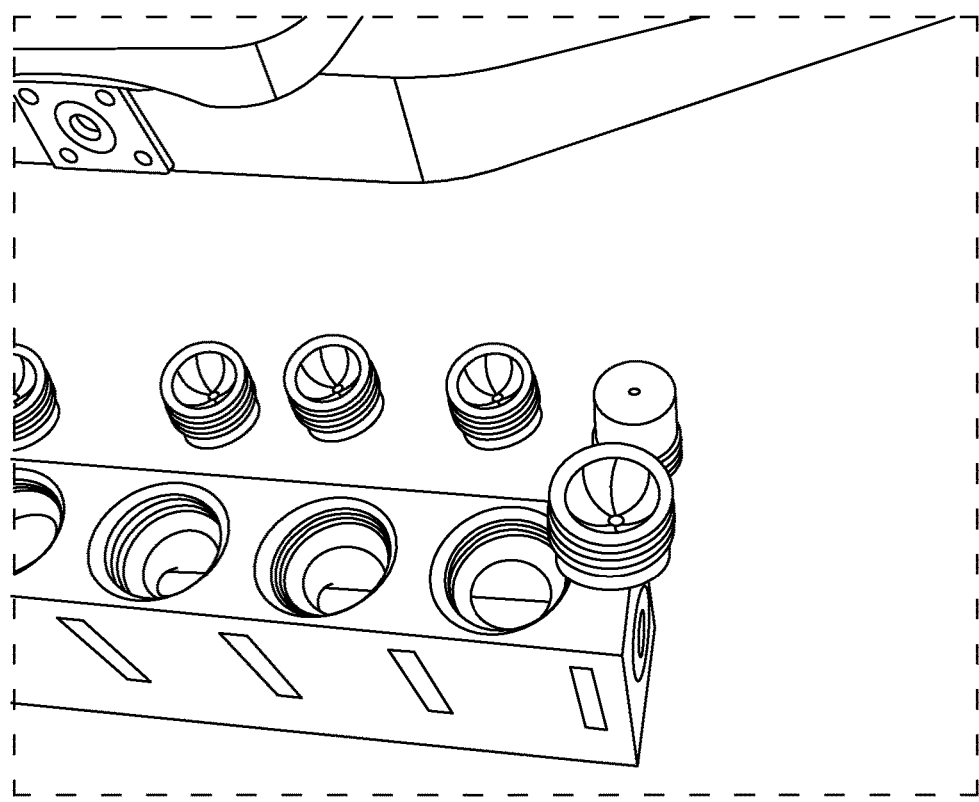

Step 4—Add the End Caps (FIG. 34, 35)

The ARCS module plug (end caps) can now be fitted into place, inlet and outlet. It has been found that finger tight was sufficient to keep the levels even and secure. Check the 1 mm holes in the center are free from any obstructions or blockages. Any blockages will prevent ARCS from working effectively when restricting exhaust gases.

A simple visual check of each end cap is made to ensure that the 1 mm hole is not blocked.

Step 5—Add the Microwave Connectors (FIG. 36)

Figures 36A, 36B:
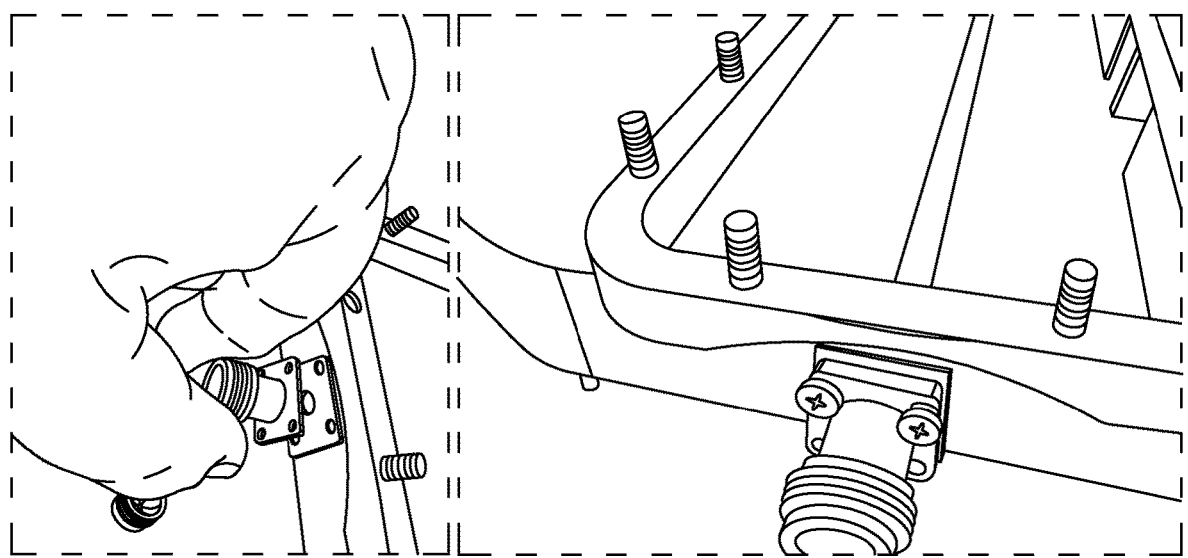

The connectors can now be put in place on both ends, and the extended launcher (waveguide) is placed between the connectors. This helps to strip back the insulation on the connectors leaving just 1 mm exposed in the unit at both ends, which stops shorting (which may prevent the ARCS unit from working correctly). FIG. 36(b) shows how the launcher (waveguide) sits in the unit without the block attached. This aids in the set-up and tune-up of the ARCS unit. In particular, preferably, there should be no more than 0.5 mm air gap. The air gap is the gap between the body of the ARCS unit and the block.

Figure 37:
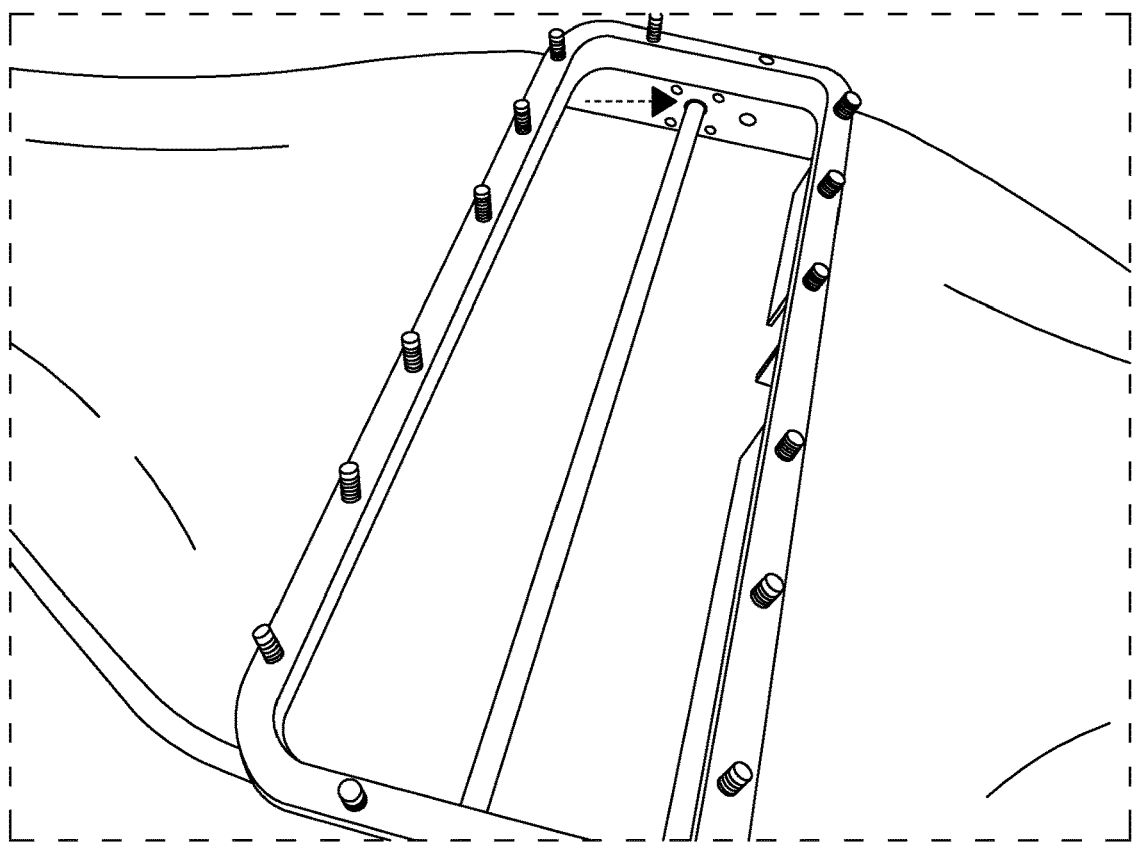

Step 6—Trim the Microwave Connector Insulation (FIG. 37)

When placing the launcher between the connectors it is easy to trim the white insulation back to just 1 mm beyond the body. This also provides a small airgap as is shown in FIG. 37 (white arrow).

Figure 38:
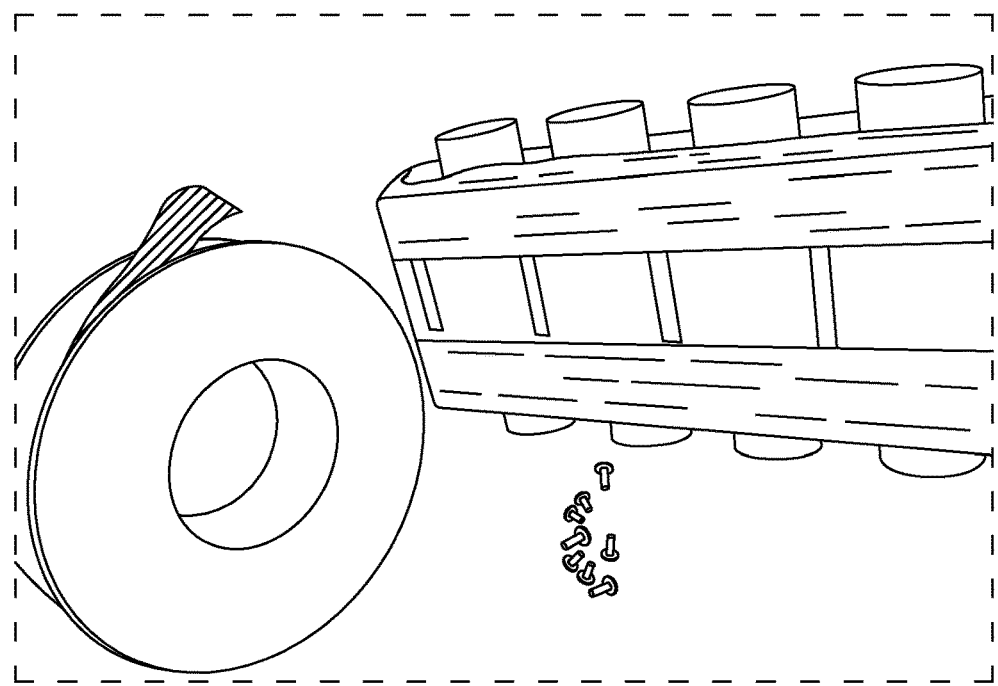

Step 7—Add the Gas Seal from the Block to the Body (FIG. 38)

The next step is to create a tight seal on the block and the body. In the embodiment this is done by wrapping PTFE tape in a double end pattern (see FIG. 38). This has a dual function of creating a gas tight seal and adding an extra method of securing mica holders in position. The launcher stops the holders from being able to drop out, but this method keeps the holders central to the block. However, it is understood by the person skilled in the art that any other suitable seal and fixing means may be used.

For example, a fluid tight seal may instead be effected between the block and the body in which the block is housed by using a compressible gasket.

Step 8—Remove the Microwave Connectors

Remove the microwave connectors.

Figure 39:
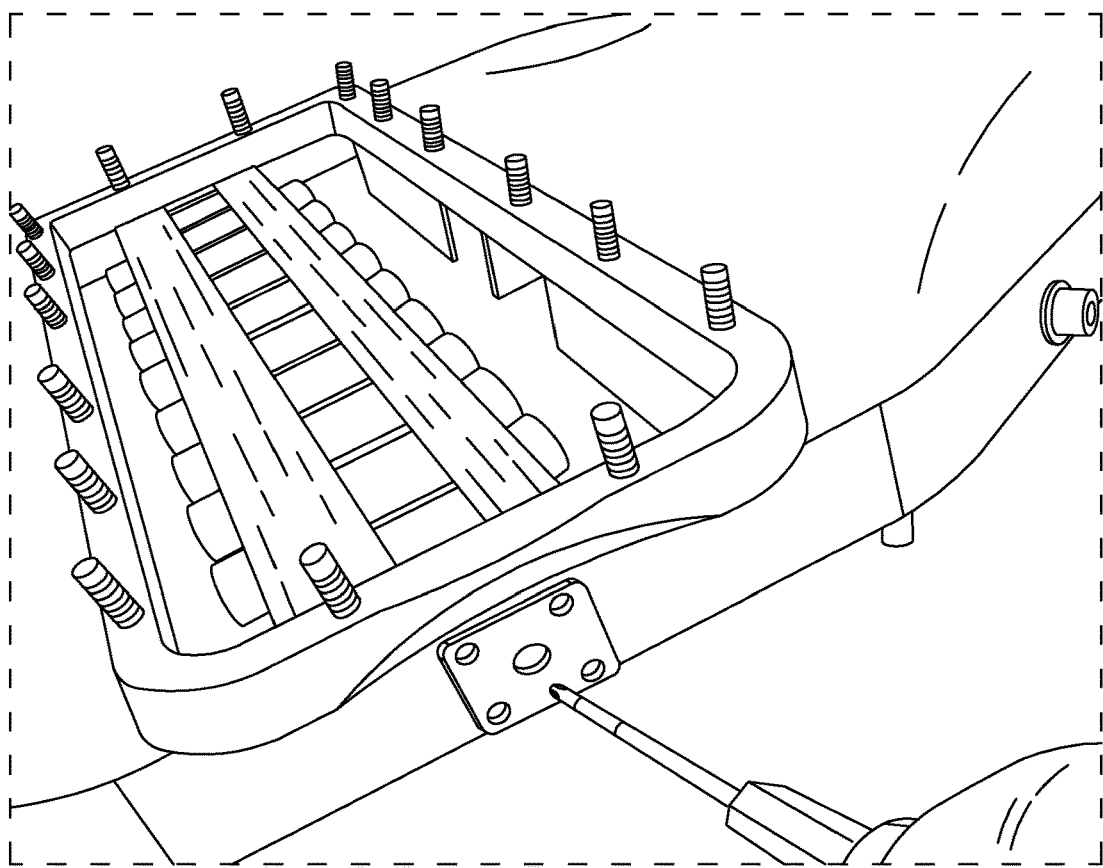

Step 9—Place ARCS Block into the Body of the Unit (FIG. 39)

After removing the microwave connectors the next step is to push the block into position. This should be a nice snug fit with slight pressure sliding the block into position. It is possible to use the position of the launcher to align the block with the holes for the connectors, and then gently ease the block into position. When looking through the hole for the connector it is possible to see the launcher. The launcher is centralised by sight, creating an equal gap at both ends. The launcher may be moved (pushed) with a small screw driver.

Figure 40:
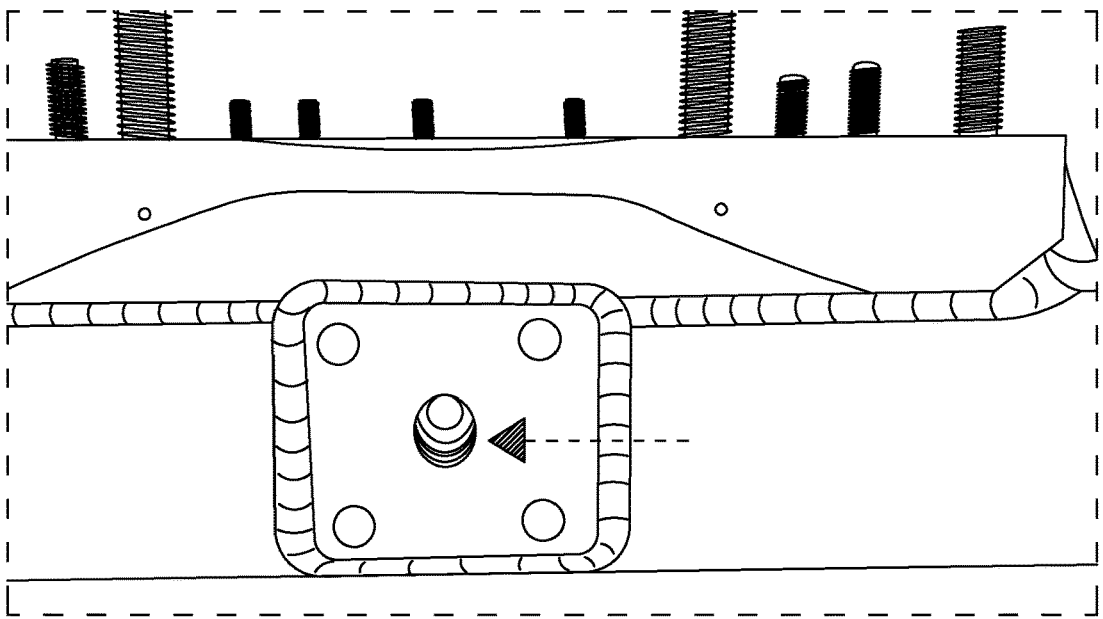

Step 10—Confirm the Extended Launcher Position Relative to the Body of the Unit (FIG. 40)

It is possible to see the launcher through the hole allowing to determine where the launcher sits in relation to the ARCS body. By checking both ends the launcher is positioned centrally by using a small screw driver to push the launcher creating an equal air gap. (see FIG. 40, white arrow).

Figure 41B:
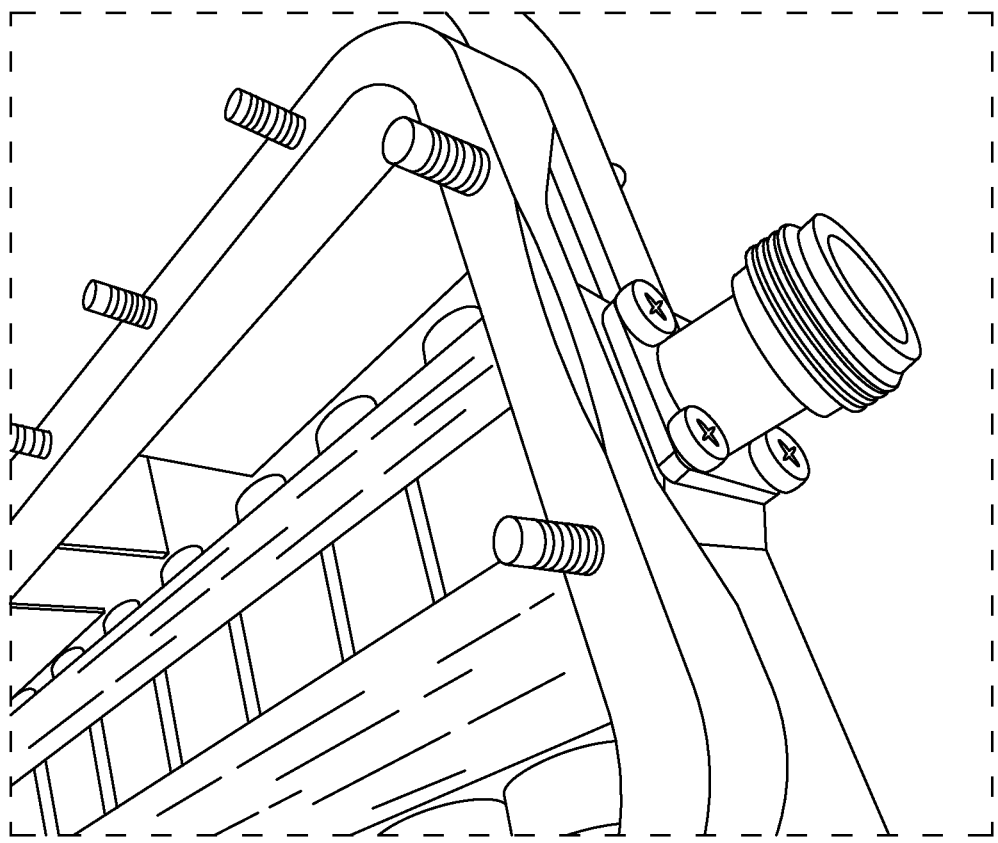
Figure 41A:
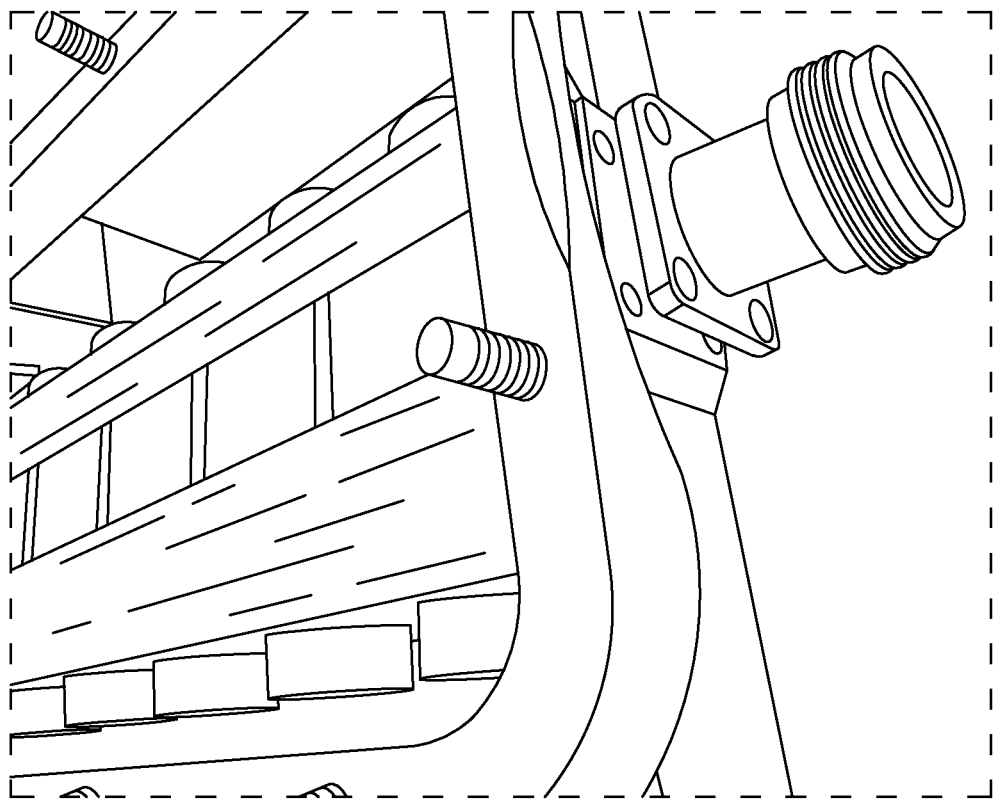

Step 11—Add the Microwave Connectors for the Final Time (FIG. 41)

By pushing both connectors into position first before screwing the connectors into position an equal gap can be maintained at both ends for the launcher. In case of a reduced emission reduction, this can be down to the placement of the launcher. This is the best way to tune the ARCS system for optimum reduction.

It has also been found that using launchers with slightly different lengths, e.g. from 218 mm to 220 mm varying by 0.1 of a mm, helps to tune up the system (though, depending on the cars tested). This can therefore be used as an additional method for tune-up. It has been found that, if the launcher is to short, it will not turn on.

Further, tighten both connectors slowly simultaneously to maintain launchers central positioning. This is best done by feel and when installing the connectors at the same time, it is possible to feel the pins from the connectors entering the launcher. Though, care should be taken not to push the launcher from one end so as to give an unbalanced setting, potentially reducing efficiency.

Figure 42:
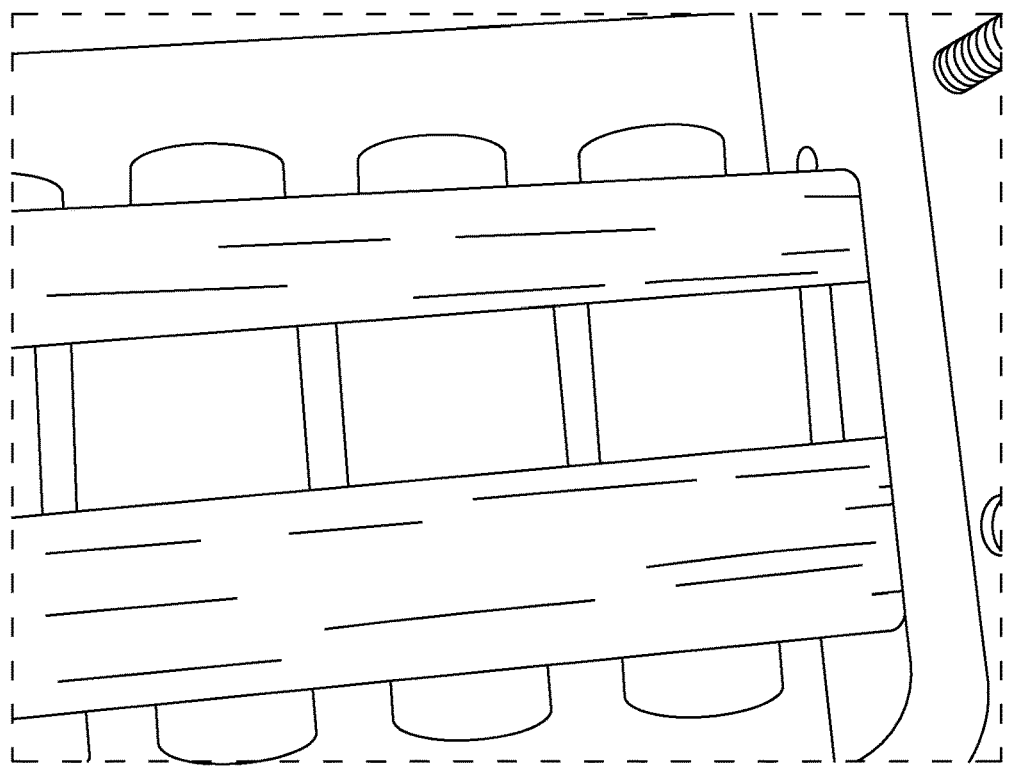

Step 12—Check the Gas Seal (FIG. 42)

FIG. 42 shows a snug fit of the block (i.e. the PTFE tape is perfect for a secure seal). Also, once the lid is screwed down, it presses on the block completing a very tight seal and holding the block securely in position.

Figure 43:
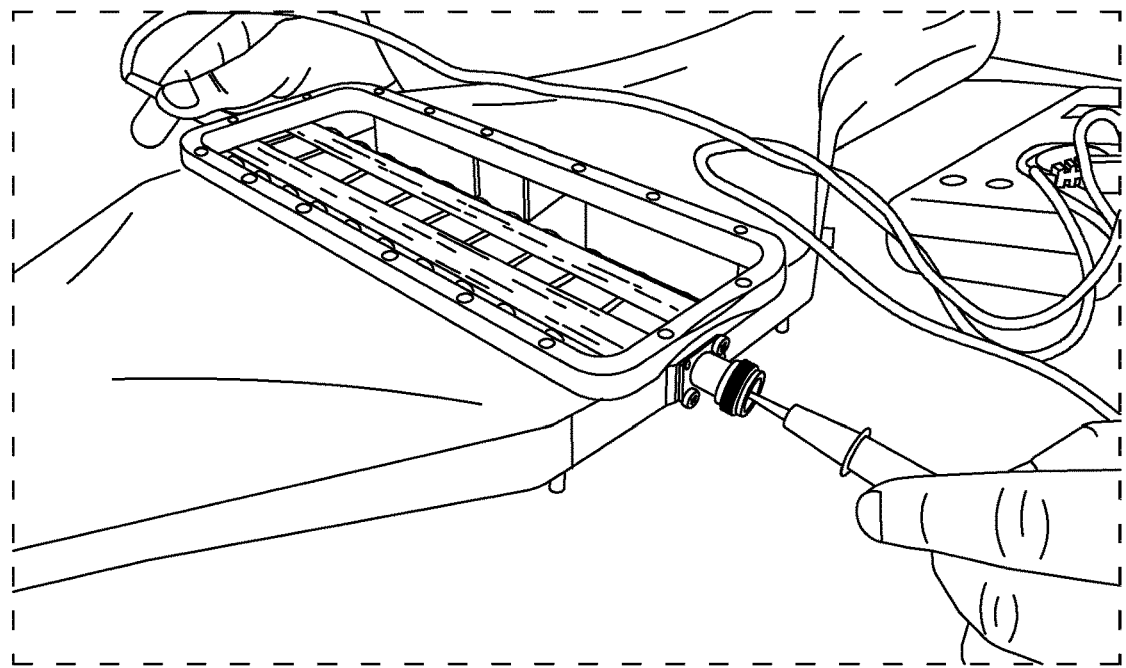

Step 13—Continuity Check and Short Circuit Check (FIG. 43)

Test the continuity between the centre pins of each microwave connector to ensure an electrical connection is achieved via the extended launcher. Also, check for any short circuits to ensure that the body of the unit has not shorted to the extended launcher. Carry out this step before fitting the inspection lid.

Figure 44:
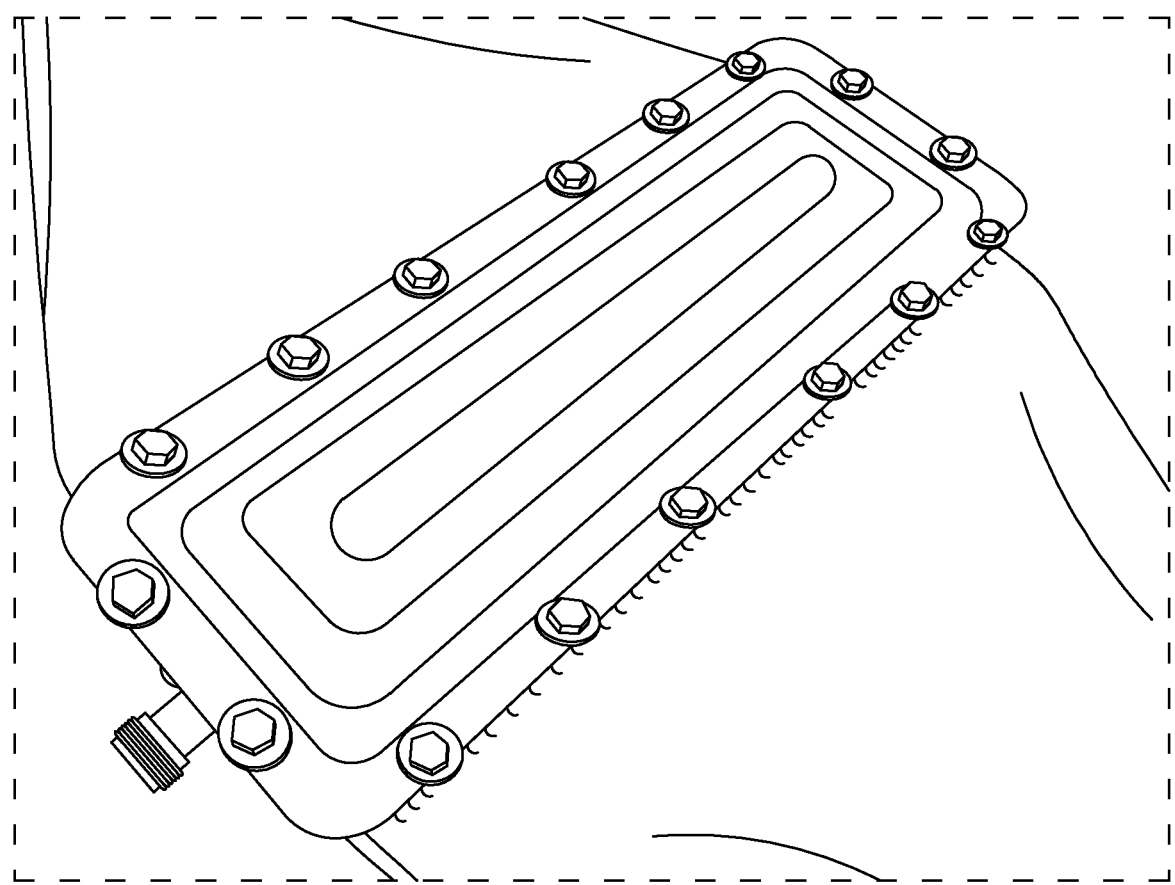
Figure 45:
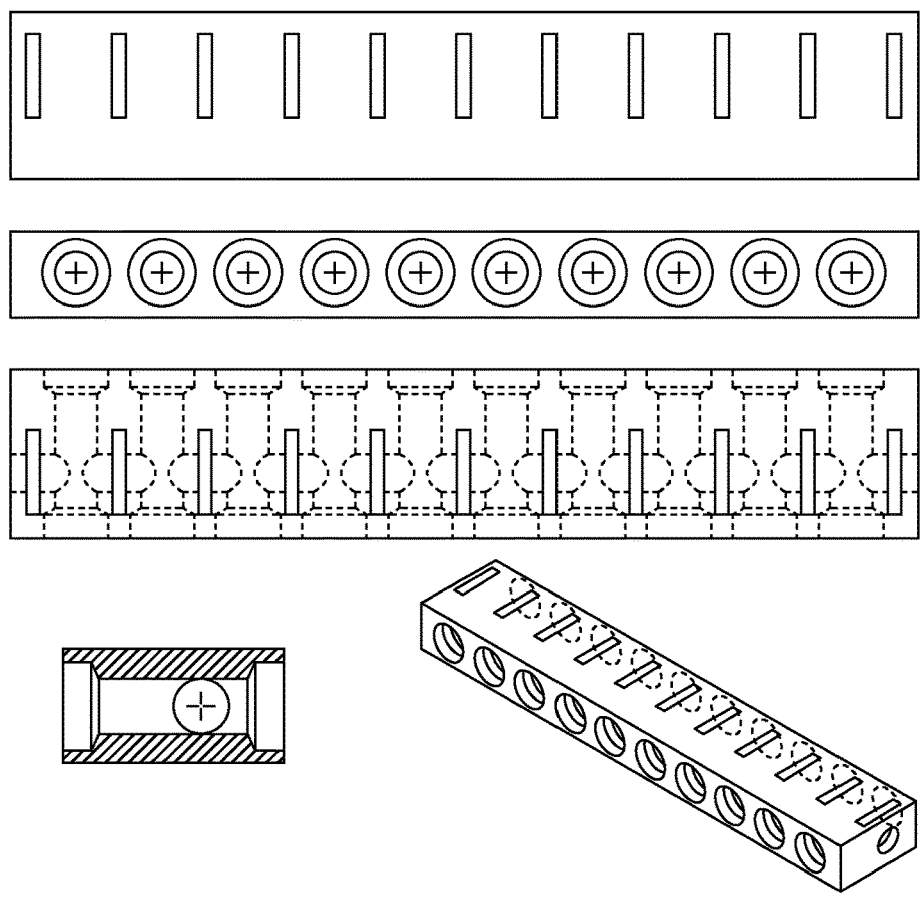
FIGS. 45 to 51 show schematics of specific example embodiments of the individual parts required for the assembly of the ARCS block design.
Figure 46:
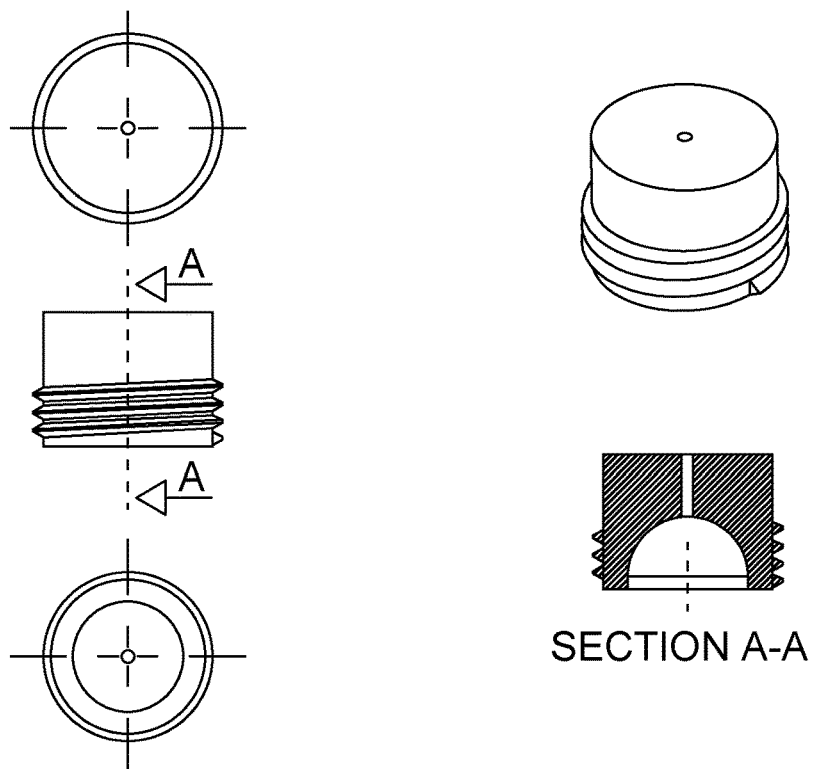
Figure 47:
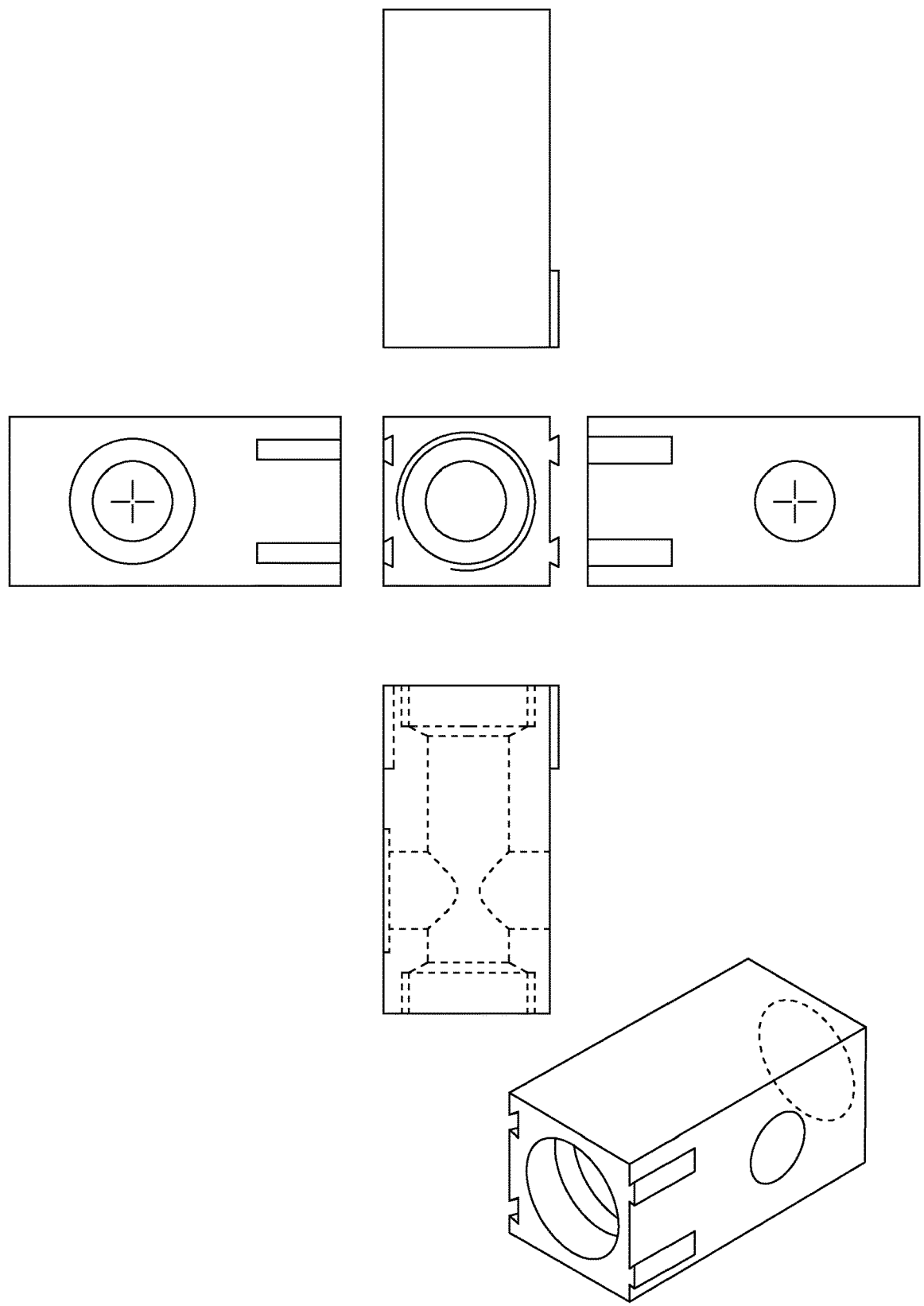
Figure 48:
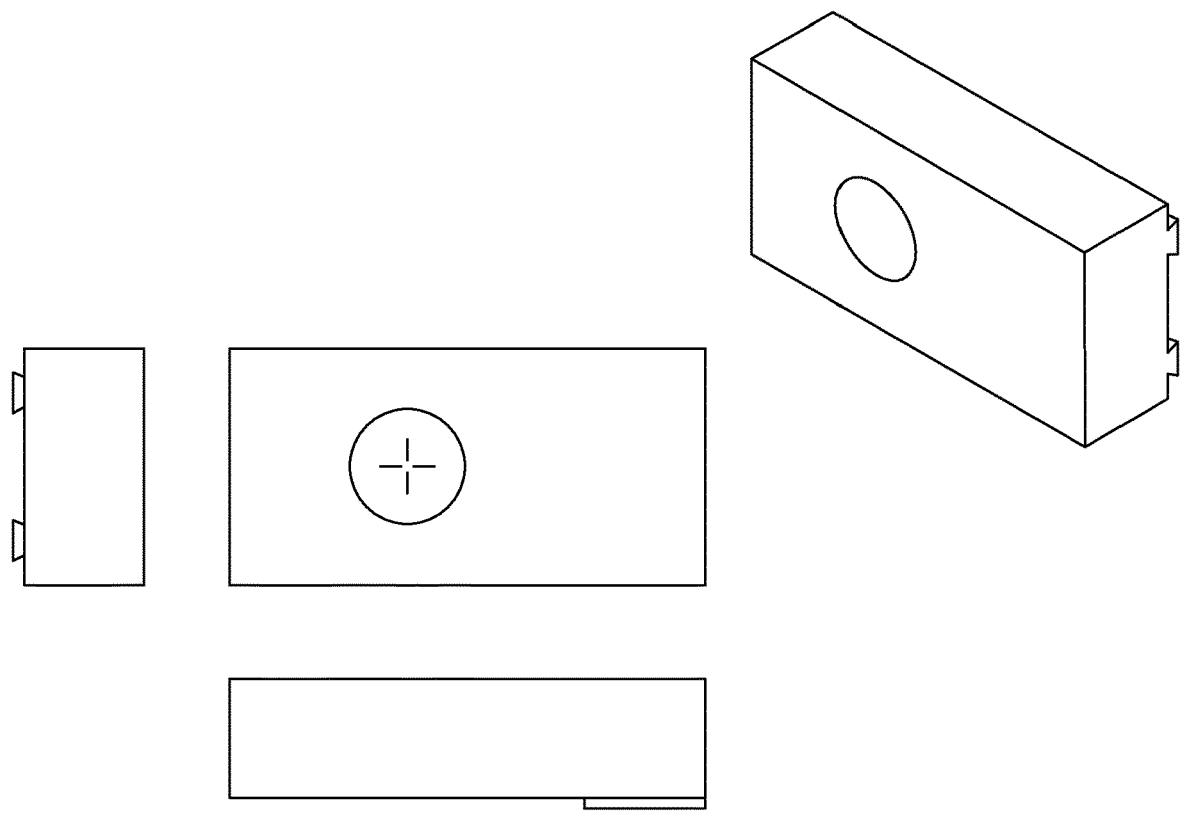
Figure 49:
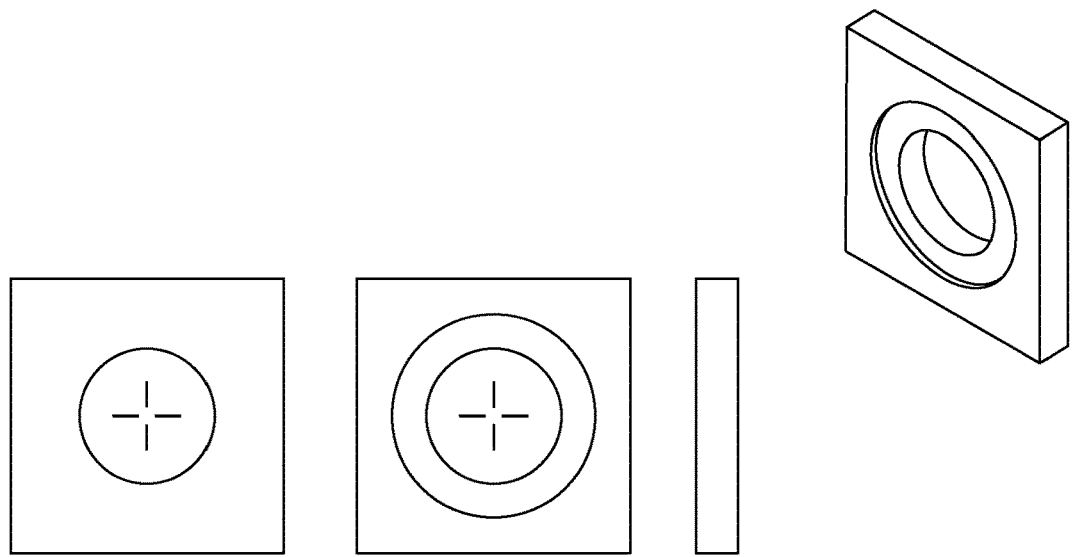
Figure 50:
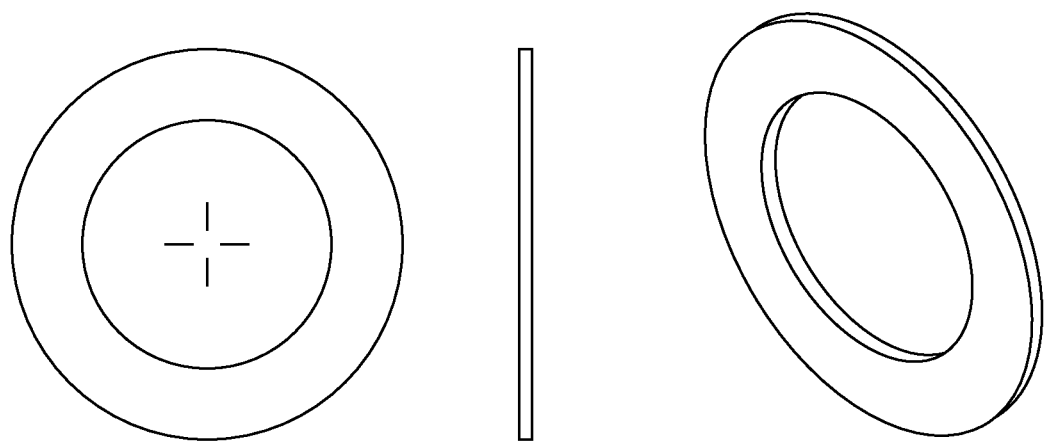
Figure 51:
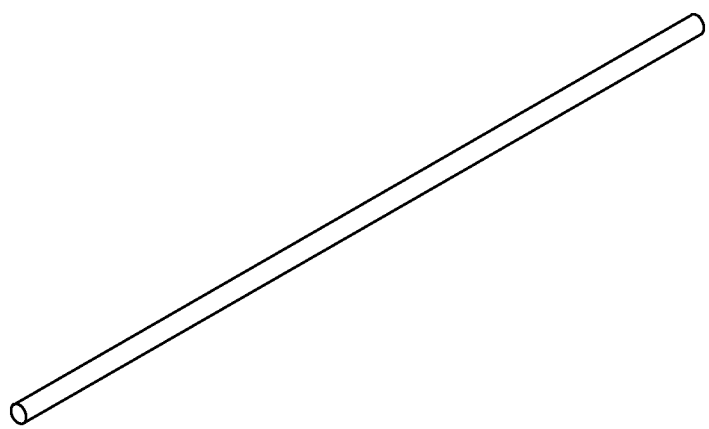

Step 14—Add the Inspection Lid (FIG. 44)

Closing the lid of the exhaust system. This is the last step in the assembly of the ARCS unit.

(iv) Specific embodiments (and dimensions) of parts of the ARCS unit (block): FIGS. 45 to 51 are engineering drawings of an example embodiment of a solid block design suitable to fit inside an exhaust system. A segmented design may be used for different body sizing, i.e. creating the flexibility to make the equivalent of a solid block and only requiring the extended launcher (waveguide) to be sized in relation to the new body sizing.

The mica disc (which could also be a ceramic disc or any material that is microwave reflective, this material can be selected for ease of mass production).

The internal dimension of the mica disc should always be the same size as the extended launcher (waveguide). In the described embodiment, this was reduced to 4.8 mm center hole and 15 mm outside diameter.

It will be appreciated by persons skilled in the art that the above embodiment has been described by way of example only and not in any limitative sense, and that various alterations and modifications are possible without departing from the scope of the invention as defined by the appended claims.

The invention claimed is:

1. A fluid treatment system comprising:
   an exhaust system comprising:
      an array of a plurality of operably coupled fluid treatment apparatus for the treatment of a fluid substance, each one of the plurality of fluid treatment apparatus comprises:
         a reactor chamber defined by a perimeter wall;
         a fluid inlet having an inlet port adapted to provide fluid communication from an external supply of said fluid substance to be treated to said reactor chamber whereby said fluid substance passes into and through said reactor chamber, the fluid inlet has an outwardly progressively flare and a curved profile;
         a fluid outlet having an outlet port adapted to provide a fluid communication from said reactor chamber whereby said fluid substance passes from said reactor chamber, the fluid outlet has an inwardly progressive taper and a curved profile;

at least one electromagnetic radiation (EMR) waveguide, having an optical interface comprising a first interface member operably coupled to a waveguide input port and a second interface member operably coupled to a waveguide output port, said waveguide input port and said waveguide output port operably coupled to diametrically opposed spaced apart locations on said perimeter wall of said reactor chamber and adapted to couple electromagnetic radiation of at least one predetermined wavelength to said fluid substance passing through said reactor chamber, wherein the outwardly progressing flare and curved profile of said fluid inlet is shaped so that said fluid substance received from said fluid inlet is forced into a continuous swirling flow when passing through said reactor chamber towards said fluid outlet, and wherein the outwardly progressing flare and curved profile of said inlet port is adapted to change an initial fluid pressure of said fluid substance to a predetermined first fluid pressure when passing through said fluid inlet port into said reactor chamber, and wherein the inwardly progressive taper and curved profile of said outlet port is adapted to change a chamber fluid pressure of said fluid substance to a predetermined second fluid pressure when passing through said fluid outlet port into said fluid outlet.

2. A fluid treatment system according to claim 1, wherein said electromagnetic radiation (EMR) waveguide comprises first and second EMR couplers provided at a respective waveguide input port and waveguide outlet port such as to be operably coupled across a full width of a reactor volume defined within said reactor chamber.

3. A fluid treatment system according to claim 2, wherein said first interface member and said second interface member comprise portions of the wall adapted to be at least partly transparent to electromagnetic radiation of a predetermined wavelength.

4. A fluid treatment system according to claim 3, wherein each of the first interface member and the second interface member comprise apertured portions of the wall having a closure plug fabricated from a material at least partly transparent to electromagnetic radiation of a predetermined wavelength.

5. A fluid treatment system according to claim 4, wherein each interface member comprises an apertured portion of the wall provided with a glass closure plug.

6. A fluid treatment system according to claim 1, wherein said at least one electromagnetic radiation (EMR) waveguide comprises a first EMR coupler operably coupled to said waveguide input port and to said first interface member, and a second EMR coupler operably coupled to said waveguide output port and to said second interface member.

7. A fluid treatment system according to claim 1, wherein the reactor chamber has a predetermined dimension, wherein the predetermined dimension and the predetermined wavelength are selected such that in use a standing wave is generated.

8. A fluid treatment system according to claim 1, wherein the predetermined wavelength is between 1 mm and 1 m at a respective frequency spectrum of 300 GHz to 300 MHz (microwave).

9. A fluid treatment system according to claim 8, wherein the predetermined wavelength is between 3 mm and 0.6 m at a respective frequency spectrum of 100 GHz to 500 MHz.

10. A fluid treatment system according to claim 1, further comprising a fluid substance supply source fluidly coupled to the fluid inlet to enable supply of said fluid substance to be treated to said reactor chamber.

11. A fluid treatment system according to claim 10, further comprising a fluid substance discharge conduit fluidly coupled to the fluid outlet to enable said fluid substance to pass from and be conveyed away from said reactor chamber.

12. A fluid treatment system according to claim 10, further comprising a heater assembly, fluidly coupled between the fluid substance supply source and the reactor chamber, and adapted to transfer energy to the fluid substance, so as to supply the fluid substance at a predetermined temperature into the reactor chamber.

13. A fluid treatment system according to claim 1, further comprising an electromagnetic radiation (EMR) generator to generate electromagnetic radiation (EMR) of a predetermined wavelength, operably coupled to said waveguide input port.

14. A fluid treatment system according to claim 13, wherein the EMR generator further comprises an input transmission line, operably coupleable to said waveguide input port of said at least one electromagnetic radiation (EMR) waveguide, and
an output transmission line, operably coupleable to said waveguide output port of said at least one electromagnetic radiation (EMR) waveguide, wherein said microwave generator, said input transmission line and said output transmission line are adapted to form a closed-loop EMR circuit with said at least one electromagnetic radiation (EMR) waveguide.

15. A fluid treatment system according to claim 13, wherein the EMR generator is a microwave generator and the generated electromagnetic radiation has a wavelength between 1 mm and 1 m at a respective frequency spectrum of 300 GHz to 300 MHz (microwave).

16. A fluid treatment system according to claim 15, wherein the generated electromagnetic radiation has a wavelength between 3 mm and 0.6 m at a respective frequency spectrum of 100 GHz to 500 MHz.

17. A fluid treatment system according to claim 13, wherein said electromagnetic radiation (EMR) generator is any one of a Magnetron, a Klystron, a Gyrotron and a solid-state electronic source.

18. A fluid treatment system according to claim 13, wherein said electromagnetic radiation (EMR) generator is adapted to optimize the coupling between said electromagnetic radiation (EMR) and said fluid substance by varying the predetermined wavelength of the electromagnetic radiation (EMR).

19. A fluid treatment system according to claim 18, wherein said coupling between said electromagnetic radiation (EMR) and said fluid substance is optimized automatically utilizing a predetermined control algorithm.

20. A fluid treatment system according to claim 1, wherein said predetermined first fluid pressure is greater than said initial fluid pressure.

21. A fluid treatment system according to claim 1, wherein said predetermined second fluid pressure is greater than said chamber fluid pressure.

22. A fluid treatment system according to claim 1, wherein said first predetermined fluid pressure is greater than said second predetermined pressure.

23. A fluid treatment system according to claim 1, further comprising:
a housing, having at least one exhaust inlet port and at least one exhaust outlet port, adapted to operably receive and enclose said array of a plurality of operably coupled fluid treatment apparatus, and at least one fluid tight seal member, adapted to engage with at least an outer surface of said array of a plurality of operably coupled fluid treatment apparatus, so as to provide a fluid tight seal between an inner surface of said housing and said at least one outer surface of said array of a plurality of operably coupled fluid treatment apparatus.

24. A fluid treatment system according to claim 23, wherein said at least one fluid tight seal member is made of a polymer.

25. A fluid treatment system according to claim 1, wherein said array of a plurality of operably coupled fluid treatment apparatus is formed from a single piece.

26. A fluid treatment system according to claim 1, wherein said array of a plurality of operably coupled fluid treatment apparatus is formed from a plurality of interconnectable modular fluid treatment apparatus.

27. A fluid treatment system comprising:
an exhaust system comprising:
an array of a plurality of operably coupled fluid treatment apparatus for the treatment of a fluid substance, each one of the plurality of fluid treatment apparatus comprises:
a reactor chamber defined by a perimeter wall;
a fluid inlet having an inlet port adapted to provide fluid communication from an external supply of said fluid substance to be treated to said reactor chamber whereby said fluid substance passes into and through said reactor chamber, the fluid inlet has an outwardly progressively flare and a curved profile;
a fluid outlet having an outlet port adapted to provide a fluid communication from said reactor chamber whereby said fluid substance passes from said reactor chamber, the fluid outlet has an inwardly progressive taper and a curved profile;
a waveguide inlet port that opens into the reactor chamber; and
a waveguide outlet port that opens into the reactor chamber;
the waveguide inlet and outlet ports of each of the plurality of fluid treatment apparatuses being aligned with one another; and
an electromagnetic radiation (EMR) waveguide extending through each of the plurality of treatment apparatuses via the aligned waveguide inlet and outlet ports.

* * * * *